United States Patent
Tsuiki et al.

(10) Patent No.: US 9,641,036 B2
(45) Date of Patent: May 2, 2017

(54) ROTARY ELECTRIC MACHINE

(71) Applicant: MITSUBISHI ELECTRIC CORPORATION, Chiyoda-ku (JP)

(72) Inventors: Hironori Tsuiki, Chiyoda-ku (JP);
Atsushi Sakaue, Chiyoda-ku (JP);
Hiroyuki Akita, Chiyoda-ku (JP);
Masaya Inoue, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 308 days.

(21) Appl. No.: 14/420,140

(22) PCT Filed: Aug. 28, 2013

(86) PCT No.: PCT/JP2013/072984
§ 371 (c)(1),
(2) Date: Feb. 6, 2015

(87) PCT Pub. No.: WO2014/034712
PCT Pub. Date: Mar. 6, 2014

(65) Prior Publication Data
US 2015/0200575 A1 Jul. 16, 2015

(30) Foreign Application Priority Data
Aug. 31, 2012 (JP) ................. 2012-191792

(51) Int. Cl.
*H02K 3/04* (2006.01)
*H02K 3/28* (2006.01)
(Continued)

(52) U.S. Cl.
CPC ............... *H02K 3/28* (2013.01); *H02K 15/04* (2013.01); *H02K 15/085* (2013.01)

(58) Field of Classification Search
CPC .......... H02K 3/12; H02K 3/28; H02K 15/045; H02K 3/04
(Continued)

(56) References Cited

U.S. PATENT DOCUMENTS 2,071,977 A * 2/1937 Herrick .................... H02K 3/12
310/208
2,921,207 A * 1/1960 Fletcher .................. H02K 3/12
310/206
(Continued)

FOREIGN PATENT DOCUMENTS

| | | |
|---|---|---|
| JP | 2001-286082 A | 10/2001 |
| JP | 2003-235191 A | 8/2003 |

(Continued)

OTHER PUBLICATIONS

Office Action issued in corresponding Japanese Patent Application No. 2014-533041, mailed Aug. 4, 2015, with English translation (7 pages).

(Continued)

*Primary Examiner* — Thanh Lam
(74) *Attorney, Agent, or Firm* — Buchanan Ingersoll & Rooney PC

(57) ABSTRACT

A U-phase coil that constitutes an armature winding includes four (first through fourth) small coil groups U101, U102, U201, and U202 that make one round circumferentially, that are formed by connecting in series in order of circumferential arrangement winding bodies that are housed in slot pairs that are separated by 360 electrical degrees. The U-phase coil is configured into a parallel circuit in which the first and fourth small coil groups U101 and U202, which are connected in series, and the second and third small coil groups U102 and U201, which are connected in series, are connected in parallel by linking together winding ends within a radially inner winding end group using crossover wires 711

(Continued)

and 721, and by linking together winding ends within a radially outer winding end group using a crossover wire 821.

8 Claims, 27 Drawing Sheets

(51) Int. Cl.
  *H02K 15/04* (2006.01)
  *H02K 15/085* (2006.01)

(58) Field of Classification Search
  USPC ......... 310/179–180, 184–185, 201–203, 208
  See application file for complete search history.

(56) References Cited

U.S. PATENT DOCUMENTS

| | | | |
|---|---|---|---|
| 6,791,227 B2* | 9/2004 | Yasuhara | H02K 3/12 |
| | | | 310/179 |
| 2001/0026109 A1 | 10/2001 | Higashino et al. | |
| 2003/0127933 A1* | 7/2003 | Enomoto | C07D 493/04 |
| | | | 310/194 |
| 2005/0110360 A1* | 5/2005 | Neet | H02K 3/28 |
| | | | 310/208 |
| 2008/0093948 A1* | 4/2008 | Naganawa | H02K 15/063 |
| | | | 310/203 |
| 2008/0231136 A1* | 9/2008 | Obata | H02K 3/345 |
| | | | 310/179 |
| 2009/0001841 A1 | 1/2009 | Naganawa et al. | |
| 2011/0057537 A1* | 3/2011 | Matsushita | H02K 3/18 |
| | | | 310/208 |
| 2012/0025658 A1* | 2/2012 | Watanabe | H02K 3/12 |
| | | | 310/179 |
| 2012/0319523 A1* | 12/2012 | Manabu | H02K 15/0464 |
| | | | 310/201 |

FOREIGN PATENT DOCUMENTS

| | | |
|---|---|---|
| JP | 2008-104293 A | 5/2008 |
| JP | 2008-125212 A | 5/2008 |
| JP | 2009-011116 A | 1/2009 |
| JP | 2009-131058 A | 6/2009 |
| JP | 2010166802 A | 7/2010 |
| WO | WO2011/074114 A1 | 6/2001 |

OTHER PUBLICATIONS

International Search Report (PCT/ISA/210) mailed on Dec. 3, 2013, by the Japanese Patent Office as the International Searching Authority for International Application No. PCT/JP2013/072984.
Written Opinion (PCT/ISA/237) mailed on Dec. 3, 2013, by the Japanese Patent Office as the International Searching Authority for International Application No. PCT/JP2013/072984.

* cited by examiner

ROTARY ELECTRIC MACHINE

TECHNICAL FIELD

The present invention relates to a rotary electric machine such as an electric motor or a generator, for example, and particularly relates to an armature winding connecting construction.

BACKGROUND ART

In recent years, compactness, high output, and high quality have been required in rotary electric machines such as electric motors or generators. With regard to downsizing rotary electric machines of this kind, armature windings that have concentrated windings in which conductor wires are wound onto individual armature core teeth have been used with a view to downsizing coil ends, which do not generate effective magnetic flux. However, armatures that use armature windings of distributed winding construction that can suppress torque pulsation and increase output are in demand. In addition, demand for induction machines that do not use magnets has also increased due to steep rises in magnet prices, and there is demand for armatures that use higher-efficiency distributed winding armature windings.

Here, in contrast to concentrated windings, which are configured by winding conductor wires onto individual teeth, windings that are configured by winding conductor wires into slots that are separated by greater than or equal to two slots are designated "distributed windings". In other words, distributed windings are wound such that a conductor wire that extends outward from one slot spans two or more consecutive teeth and enters another slot.

In conventional rotary electric machines such as that described in Patent Literature 1, hexagonal winding coils that are formed into a coil shape by winding a rectangular conductor wire a plurality of times are housed in respective pairs of slots that are positioned on two sides of six circumferentially consecutive teeth, to constitute a distributed winding armature winding. Crank shapes are formed without twisting at approximately vertex portions at two ends of the winding coils to suppress axial enlargement of the rotary electric machine, and achieve downsizing.

CITATION LIST

Patent Literature

[Patent Literature 1] Japanese Patent Laid-Open No. 2008-104293 (Gazette)

SUMMARY OF THE INVENTION

Problem to be Solved by the Invention

However, in Patent Literature 1, there is no disclosure regarding a method for connecting the winding coils to each other, and depending on the connection method, axial dimensions may be increased by crossover wires that connect the winding coils to each other, preventing downsizing of the rotary electric machine.

Furthermore, modifications to armature winding specifications are accommodated by changing winding coil connections, but modifying the connections is complicated, and the corresponding number of parts may be increased, leading to steep rises in manufacturing costs.

The present invention aims to solve the above problems and an object of the present invention is to provide a rotary electric machine that enables downsizing by simplifying connection between small coil groups and connection between phase coils to enable modification of armature winding specifications to be accommodated simply, and also by adapting connection between winding bodies that constitute the small coil groups to suppress enlargement of axial dimensions.

Means for Solving the Problem

In order to achieve the above object, according to one aspect of the present invention, there is provided a rotary electric machine including an armature that is configured by mounting an armature winding into an annular armature core, slots being formed on the armature core at a ratio of q slots per phase per pole, where q is a natural number that is greater than or equal to two. The armature winding includes a plurality of winding bodies that are each configured by winding a conductor wire into a helical shape for m turns, where m is a natural number that is greater than or equal to two, so as to have: rectilinear portions that are arranged into first and second columns such that m of the rectilinear portions line up in each of the columns; and coil ends that link together end portions of the rectilinear portions between the columns, a first winding end of the conductor wire extending outward at a first longitudinal end of a rectilinear portion that is positioned at a first end in a direction of arrangement of the rectilinear portions in the first column, and a second winding end of the conductor wire extending outward at the first longitudinal end of a rectilinear portion that is positioned at a second end in the direction of arrangement of the rectilinear portions in the second column, and the plurality of winding bodies are respectively arranged at a pitch of one slot in a circumferential direction of the armature core such that each of the columns of the rectilinear portions that are arranged in the two columns is housed in each of a pair of slots that are positioned on two sides of a plurality of teeth that are consecutive in the circumferential direction, the first winding ends being arranged circumferentially so as to extend outward from a shallowest portion in a slot depth direction of the slots to form a radially inner winding end group, and the second winding ends being arranged circumferentially so as to extend outward from a deepest portion in the slot depth direction of the slots to form a radially outer winding end group. Phase coils that constitute the armature winding each include 2q small coil groups that make one round circumferentially, the small coil groups being formed by connecting in series winding bodies that are housed in a pair of slots that are separated by 360 electrical degrees by linking winding ends of the radially inner winding end group and winding ends of the radially outer winding end group in order of circumferential arrangement, and connection between the small coil groups that form the phase coils and connection between the phase coils are made by connecting together winding ends within the radially inner winding end group and connecting together winding ends within the radially outer winding end group.

Effects of the Invention

According to the present invention, phase coils that constitute an armature winding are formed by connecting in series winding bodies that are housed in a pair of slots that are separated by 360 electrical degrees by linking winding ends of the radially inner winding end group and winding ends of the radially outer winding end group in order of circumferential arrangement. Thus, crossover portions that link the winding ends of the radially inner winding end group and the winding ends of the radially outer winding end group do not overlap with each other axially, suppressing enlargement of axial dimensions of the coil ends, and enabling downsizing. Because the lengths of the crossover portions are shorter, reductions in resistance and reductions in copper loss are enabled in each of the phase coils that constitute the armature winding, enabling increased efficiency and reductions in weight to be achieved.

Connection between the small coil groups that form the phase coils and connection between the phase coils are made by linking together winding ends within the radially inner winding end group and linking together winding ends within the radially outer winding end group. Thus, because the connection configuration of the small coil groups can be switched easily between series and parallel, and the connection configuration of the phase coils between wye connection and delta connection, simply by fixing the linked state in one of linkage between the winding ends within the radially inner winding end group, and linkage between the winding ends within the radially outer winding end group, and changing the linking method in the other, modifications to specifications of the armature winding can be accommodated easily. Thus, increases in the number of parts and steep rises in manufacturing costs that result from modification of connections becoming complicated can be suppressed.

DESCRIPTION OF EMBODIMENTS

Preferred embodiments of a rotary electric machine according to the present invention will now be explained with reference to the drawings.

Embodiment 1

Figure 1:
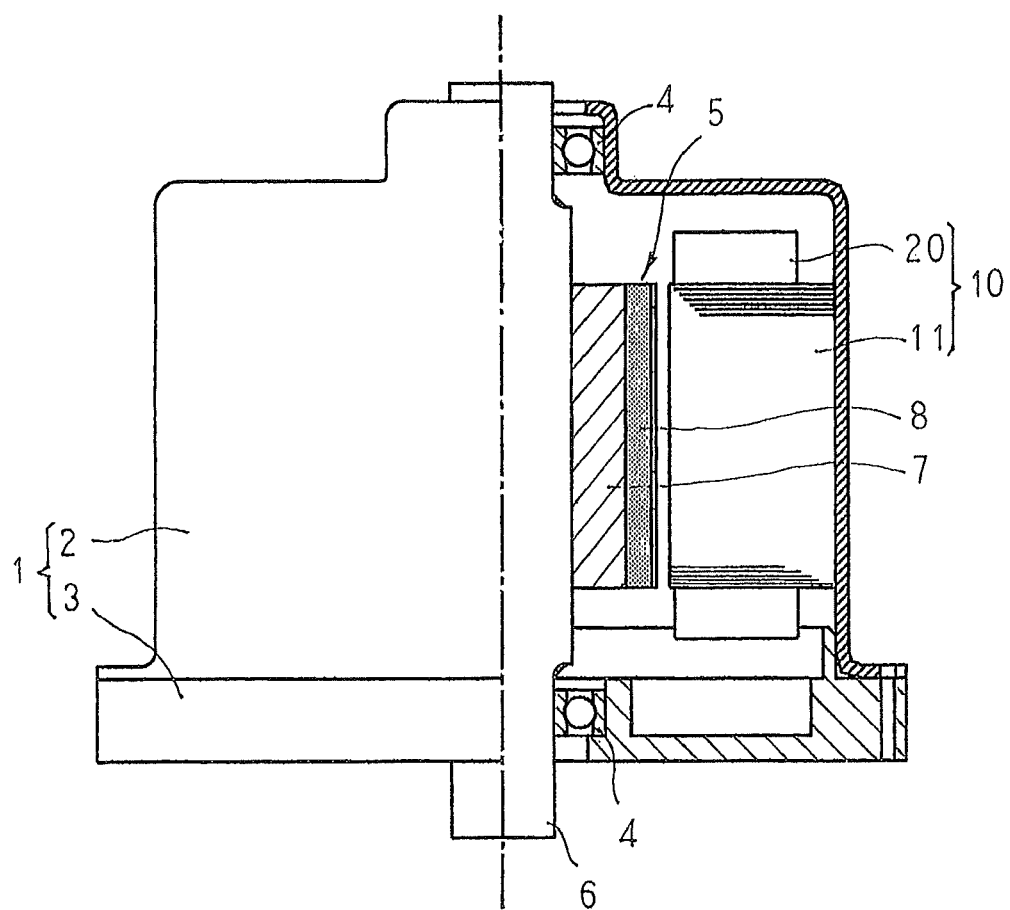
FIG. 1 is a half section that shows a rotary electric machine according to Embodiment 1 of the present invention.
Figure 2:
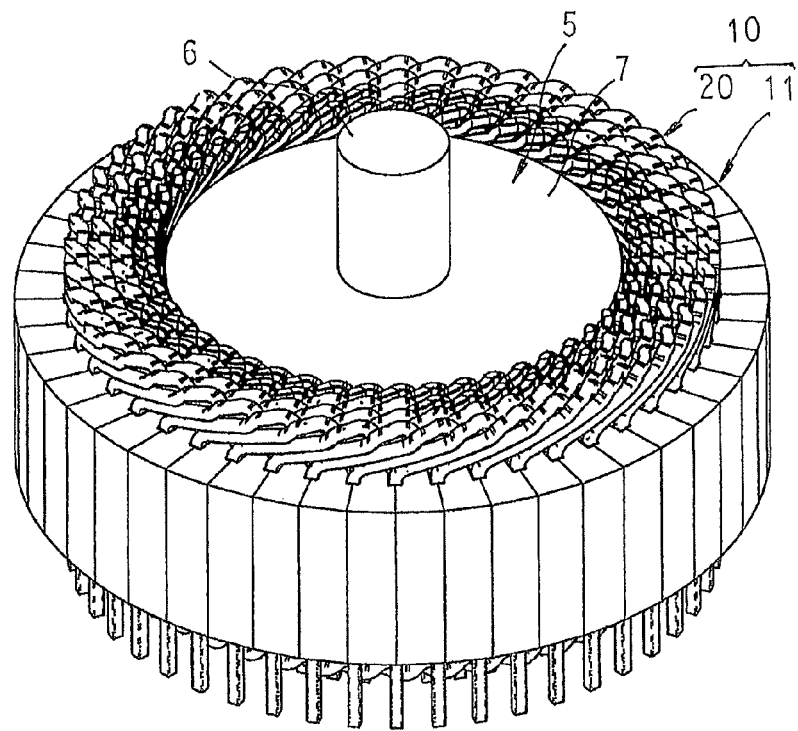
FIG. 2 is an oblique projection that shows part of the rotary electric machine according to Embodiment 1 of the present invention.
Figure 3:
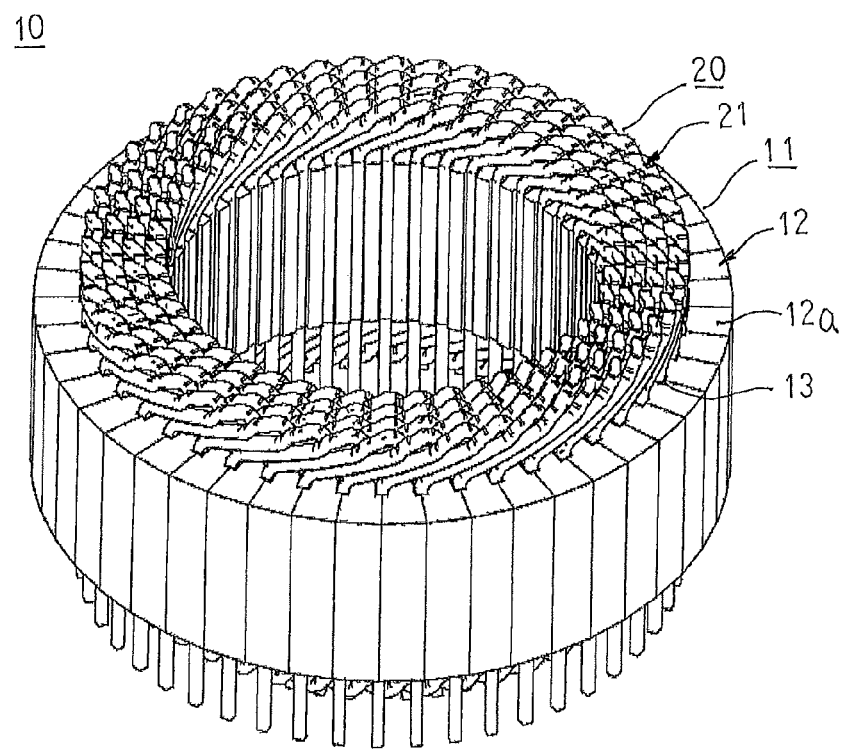
FIG. 3 is an oblique projection that shows an armature that is used in the rotary electric machine according to Embodiment 1 of the present invention.
Figure 4:
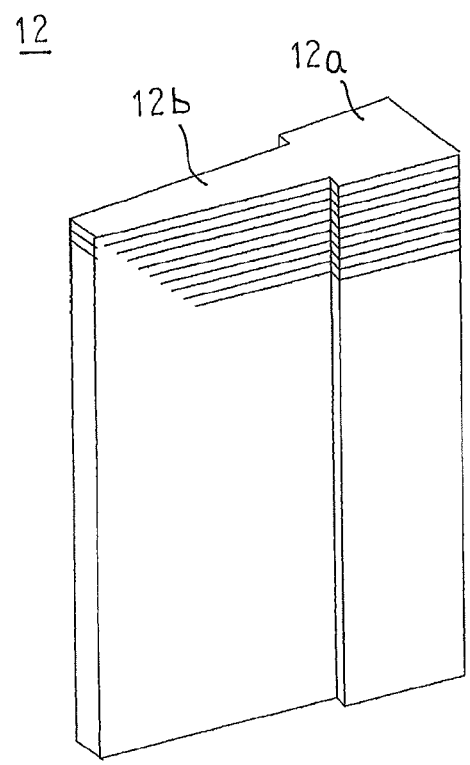
FIG. 4 is an oblique projection that shows a core block that constitutes an armature that is used in the rotary electric machine according to Embodiment 1 of the present invention.
Figure 5:
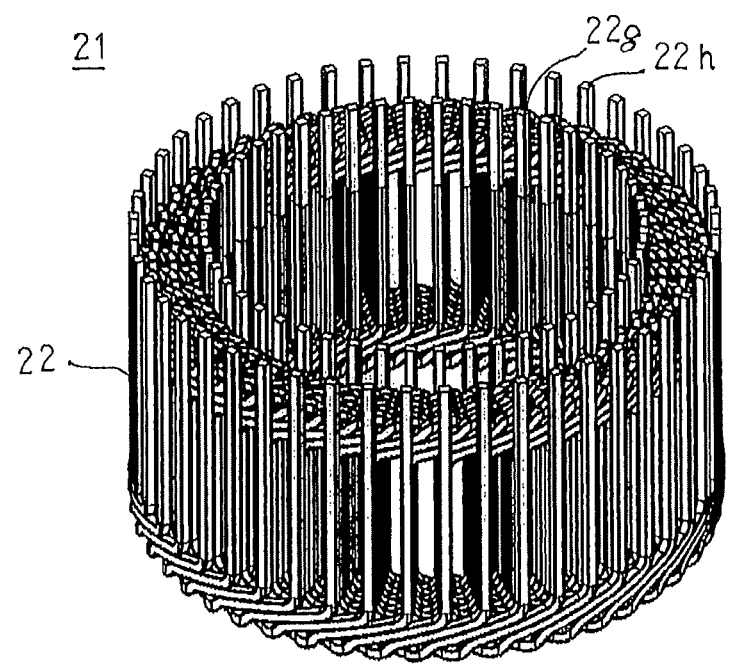
FIG. 5 is an oblique projection that shows a winding assembly that constitutes an armature winding of the armature that is used in the rotary electric machine according to Embodiment 1 of the present invention.
Figure 6:
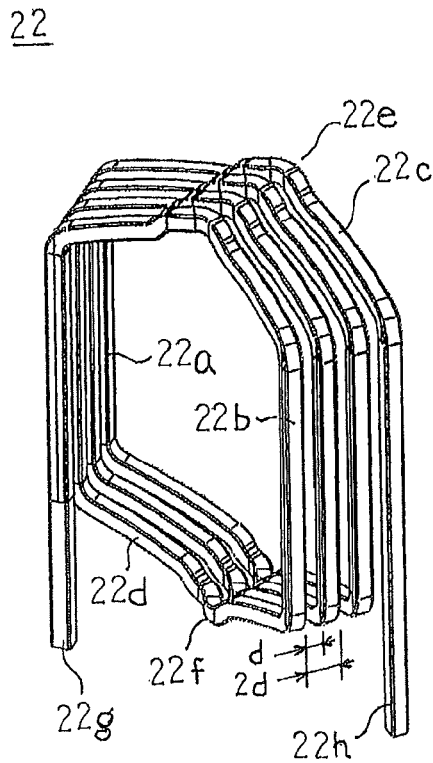
FIG. 6 is an oblique projection that shows a winding body that constitutes the winding assembly in the rotary electric machine according to Embodiment 1 of the present invention.
Figure 7:
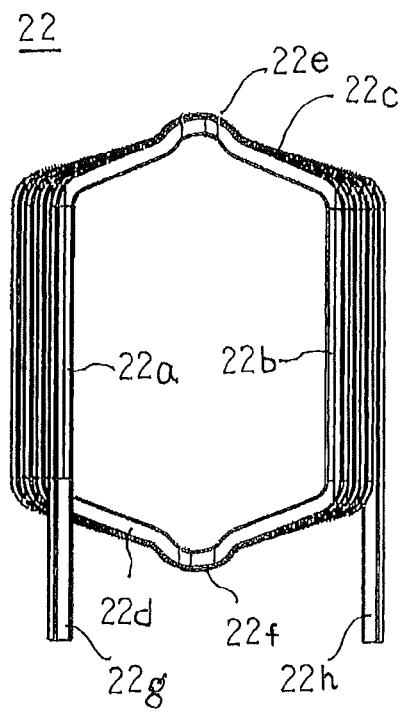
FIG. 7 is a front elevation that shows the winding body that constitutes the winding assembly in the rotary electric machine according to Embodiment 1 of the present invention.
Figure 8:
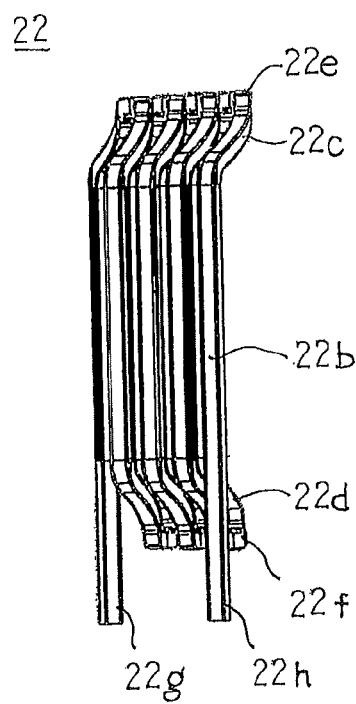
FIG. 8 is a side elevation that shows the winding body that constitutes the winding assembly in the rotary electric machine according to Embodiment 1 of the present invention.
Figure 9:
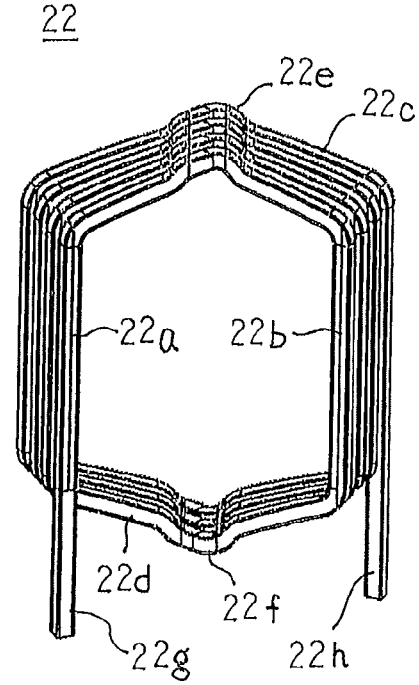
FIG. 9 is an oblique projection of the winding body that constitutes the winding assembly in the rotary electric machine according to Embodiment 1 of the present invention when viewed from obliquely above a front surface.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes an armature that is used in the rotary electric machine according to Embodiment 1 of the present invention, FIG. 5 is an oblique projection that shows a winding assembly that constitutes an armature winding of the armature that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows the winding body that constitutes the winding assembly in the rotary electric machine according to Embodiment 1 of the present invention, FIG. 8 is a side elevation that shows the winding body that constitutes the winding assembly in the rotary electric machine according to Embodiment 1 of the present invention, and FIG. 9 is an oblique projection of the winding body that constitutes the winding assembly in the rotary electric machine according to Embodiment 1 of the present invention when viewed from obliquely above a front surface.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof, and permanent magnets 8 that are embedded near an outer circumferential surface of the rotor core 7 so as to be arranged at a set pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; and an armature winding 20 that is mounted onto the armature core 11. Here, to facilitate explanation, the number of poles p in the rotor 5 is eight, the number of slots S in the armature core 11 is forty-eight, and the armature winding 20 is a three-phase winding. In other words, the slots 13 are formed on the armature core 11 at a ratio of two slots per phase per pole. Moreover, the number of slots per phase per pole q is two.

As shown in FIG. 4, core blocks 12 are made by dividing the annular armature core 11 into forty-eight equal sections circumferentially, and include: a core back portion 12a that has a circular arc-shaped cross section, that is produced by laminating and integrating a set number of electromagnetic steel sheets; and a tooth 12b that is disposed so as to extend radially inward from an inner circumferential wall surface of the core back portion 12a. The armature core 11 is configured into an annular shape by arranging and integrating forty-eight core blocks 12 circumferentially by abutting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is rectangular.

As shown in FIG. 3, the armature winding 20 is configured by applying a set connection process to the winding assembly 21 that is mounted onto the armature core 11. As shown in FIG. 5, the winding assembly 21 is configured by arranging winding bodies 22 that are housed in pairs of slots 13 that are positioned on two sides of six circumferentially consecutive teeth 12b circumferentially at a pitch of one slot. Winding ends 22g (described below) each project axially outward, and are arranged on a radially inner side of the winding assembly 21 at a pitch of one slot circumferentially. Winding ends 22h (described below) each project axially outward in an identical direction to the winding ends 22g, and are arranged on a radially outer side of the winding assembly 21 at a pitch of one slot circumferentially.

As shown in FIGS. 6 through 9, the winding bodies 22 are hexagonal coils that are configured by winding conductor wire that has a rectangular cross section that is made of unjointed continuous copper wire or aluminum wire that is insulated using an enamel resin, for example, for four turns helically into an approximate hexagon shape such that flat surfaces that are constituted by long sides of the rectangular cross sections face each other, and such that a gap d that is approximately equal to a length of short sides of the rectangular cross section is ensured between the facing flat surfaces in question. The winding bodies 22 are produced by winding the conductor wire for four turns helically into an edgewise winding to produce a tubular coil body, and subsequently forming the coil body into an approximate hexagon shape using a coil molding machine, for example. Alternatively, the winding bodies 22 may be produced by a folding and bending process so as to bend a conductor wire into an approximate hexagon shape while winding it helically.

The winding bodies 22 include: first and second rectilinear portions 22a and 22b that form two columns that are separated by an angular pitch of six slots in which four of each are arranged in a direction of short sides of the rectangular cross sections so as to leave gaps d in each of the columns; and first and second coil ends 22c and 22d that alternately link first longitudinal ends to each other and second longitudinal ends to each other between the columns of first and second rectilinear portions 22a and 22b. Moreover, an angular pitch of six slots is a pitch between slot centers of slots 13 on two sides of six consecutive teeth 12b, and corresponds to a pitch of one magnetic pole.

The first coil ends 22c extend outward at a set inclination longitudinally outward relative to the first and second rectilinear portions 22a and 22b from first ends of first rectilinear portions 22a in a first column toward second rectilinear portions 22b in a second column, are bent approximately at right angles at central portions (first top portions 22e) between the columns of the first and second rectilinear portions 22a and 22b and displaced in a direction of arrangement of the first and second rectilinear portions 22a and 22b so as to leave a gap d, and are subsequently bent approximately at right angles and extend longitudinally inward relative to the first and second rectilinear portions 22a and 22b toward the second rectilinear portions 22b in the second column at a set inclination, and are connected to first ends of the second rectilinear portion 22b in the second column.

Similarly, the second coil ends 22d extend outward at a set inclination longitudinally outward relative to the first and second rectilinear portions 22a and 22b from second ends of second rectilinear portions 22b in the second column toward first rectilinear portions 22a in the first column, are bent approximately at right angles at central portions (second top portions 22f) between the columns of the first and second rectilinear portions 22a and 22b and displaced in a direction of arrangement of the first and second rectilinear portions 22a and 22b so as to leave a gap d, and are subsequently bent approximately at right angles and extend longitudinally inward relative to the first and second rectilinear portions 22a and 22b toward the first rectilinear portions 22a in the first column at a set inclination, and are connected to second ends of the first rectilinear portions 22a in the first column.

In winding bodies 22 that are configured in this manner, the first and second rectilinear portions 22a and 22b, and the first and second coil ends 22c and 22d, are each arranged in the direction of the short sides of the rectangular cross sections of the conductor wire at a pitch (2d) that is approximately twice the length of the short sides such that flat surfaces that are constituted by the long sides of the rectangular cross sections of the conductor wire face each other. The first rectilinear portions 22a and the second rectilinear portions 22b, which are connected by means of the first top portions 22e and the second top portions 22f, are offset in the direction of arrangement so as to leave a gap d. The winding bodies 22 also include: a winding end 22g that extends outward in the longitudinal direction from the second end of a first rectilinear portion 22a that is positioned at a first end in the direction of arrangement in the first column; and a winding end 22h that extends outward in the longitudinal direction from the second end of a second rectilinear portion 22b that is positioned at a second end in the direction of arrangement in the second column. In other words, the winding ends 22g and 22h project in identical directions in a longitudinal direction of the first and second rectilinear portions 22a and 22b from diagonally opposite positions at a second end of the winding bodies 22.

Figure 14:
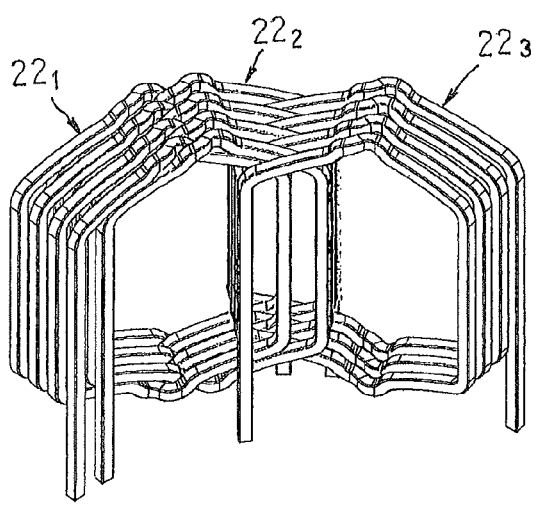
FIG. 14 is an oblique projection that explains the method for assembling the winding assembly in the rotary electric machine according to Embodiment 1 of the present invention.
Figure 15:
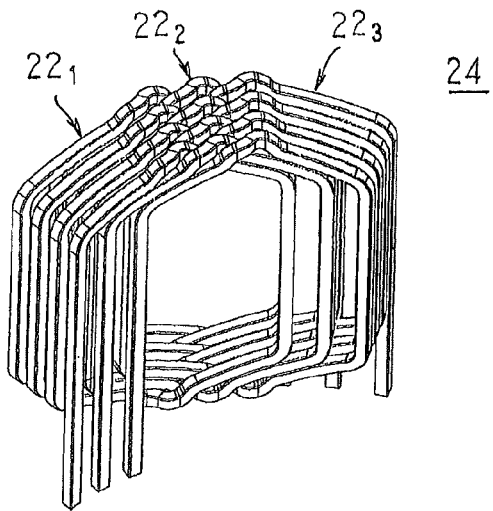
FIG. 15 is an oblique projection that explains the method for assembling the winding assembly in the rotary electric machine according to Embodiment 1 of the present invention.
Figure 16:
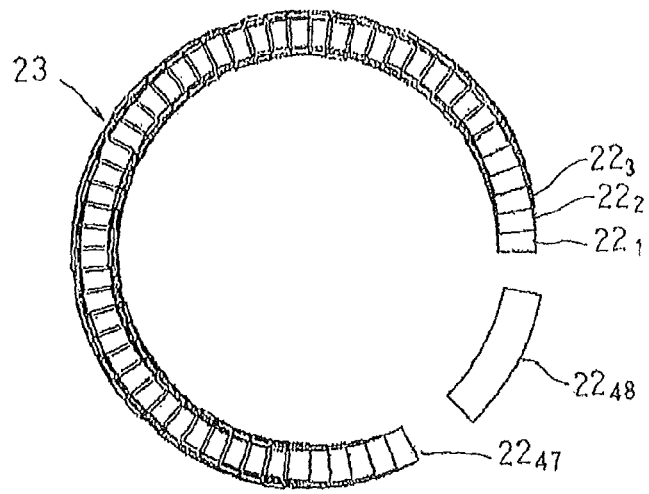
FIG. 16 is a schematic diagram that explains a procedure for installing a forty-eighth winding body in the method for assembling the winding assembly in the rotary electric machine according to Embodiment 1 of the present invention.
Figure 17:
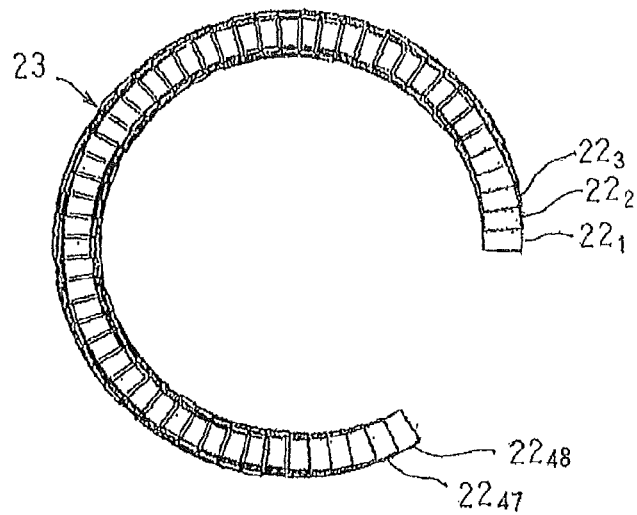
FIG. 17 is a schematic diagram that explains the procedure for installing the forty-eighth winding body in the method for assembling the winding assembly in the rotary electric machine according to Embodiment 1 of the present invention.
Figure 18:
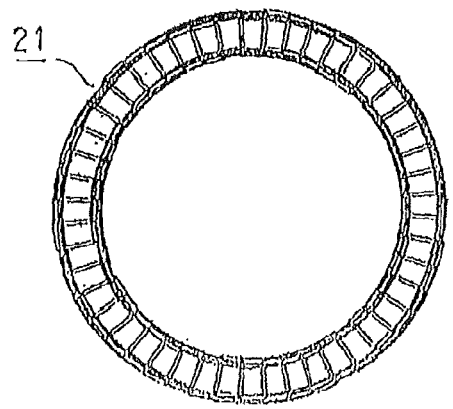
FIG. 18 is a schematic diagram that explains the procedure for installing the forty-eighth winding body in the method for assembling the winding assembly in the rotary electric machine according to Embodiment 1 of the present invention.

Next, a method for assembling the winding assembly 21 will be explained with reference to FIGS. 10 through 18. FIGS. 10 through 15 are oblique projections that explain a method for assembling the winding assembly in the rotary electric machine according to Embodiment 1 of the present invention, and FIGS. 16 through 18 are schematic diagrams that explain a procedure for installing a forty-eighth winding body in the method for assembling the winding assembly in the rotary electric machine according to Embodiment 1 of the present invention.

First, winding bodies 22 are produced by winding conductor wires for four turns into a helical shape. Here, to facilitate explanation, the winding bodies 22 are designated winding body $22_1$, winding body $22_2$, winding body 22a, winding body $22_{47}$, and winding body $22_{48}$ in order of mounting.

Figure 10:
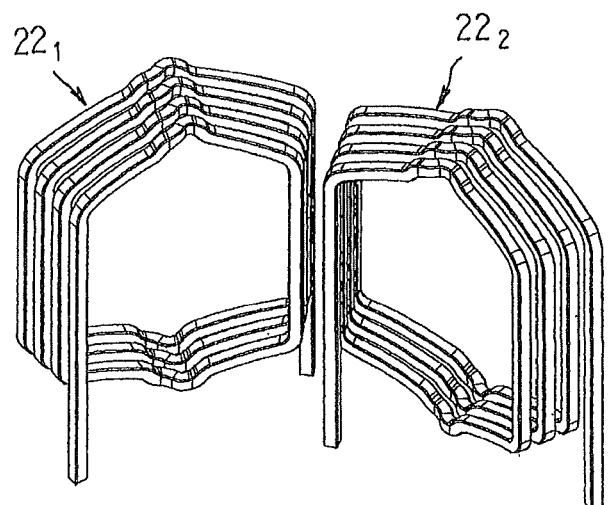
FIG. 10 is an oblique projection that explains a method for assembling the winding assembly in the rotary electric machine according to Embodiment 1 of the present invention.
Figure 11:
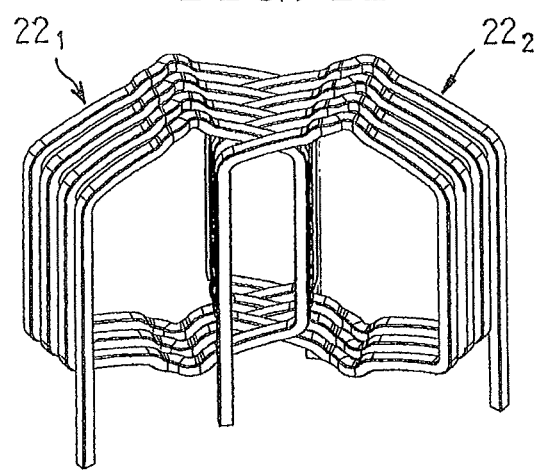
FIG. 11 is an oblique projection that explains the method for assembling the winding assembly in the rotary electric machine according to Embodiment 1 of the present invention.
Figure 12:
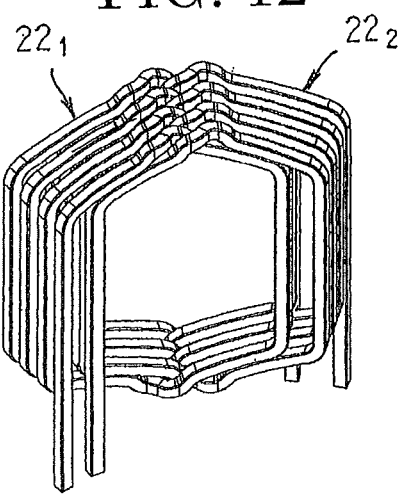
FIG. 12 is an oblique projection that explains the method for assembling the winding assembly in the rotary electric machine according to Embodiment 1 of the present invention.

Then, as shown in FIG. 10, the first and second winding bodies $22_1$ and $22_2$ are placed circumferentially adjacent to each other so as to align axial height positions. Next, as shown in FIG. 11, the first rectilinear portions 22a of the second winding body $22_2$ are inserted between the second rectilinear portions 22b of the first winding body $22_1$, which have a gap d. Next, the second winding body $22_2$ is moved circumferentially until the first rectilinear portions 22a of the second winding body $22_2$ are at a position that is separated by a pitch of one slot (the angle between the slots) from the first rectilinear portions 22a of the first winding body $22_1$. The two winding bodies $22_1$ and $22_2$ are thereby assembled as shown in FIG. 12. In the assemblage of the two winding bodies $22_1$ and $22_2$, the conductor wire of the winding body $22_2$ enters the gaps between the conductor wire of the winding body $22_1$, overlapping with each other radially and increasing rigidity.

Figure 13:
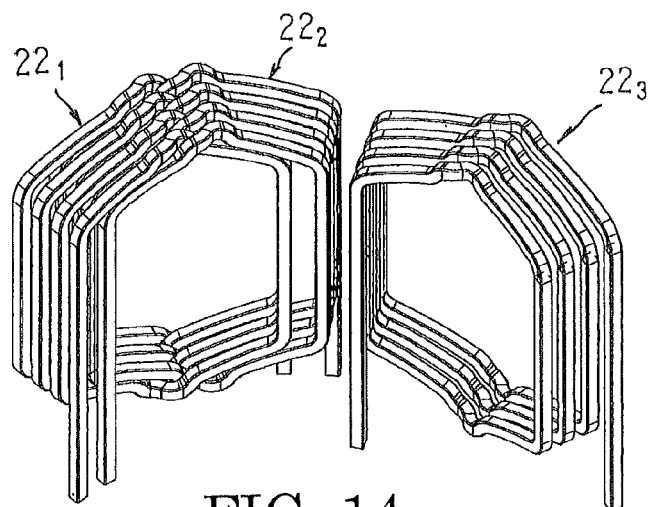
FIG. 13 is an oblique projection that explains the method for assembling the winding assembly in the rotary electric machine according to Embodiment 1 of the present invention.

Next, as shown in FIG. 13, the third winding body 22s is placed circumferentially adjacent to the assemblage of the two winding bodies $22_1$ and $22_2$ so as to align axial height positions. Next, as shown in FIG. 14, the first rectilinear portions 22a of the third winding body $22_3$ are inserted between the second rectilinear portions 22b of the winding bodies $22_1$ and $22_2$. Next, the third winding body 22s is moved circumferentially until the first rectilinear portions 22a of the third winding body $22_3$ are at a position that is separated by a pitch of one slot (the angle between the slots) from the first rectilinear portions 22a of the second winding body $22_2$. A sub-assembly 24 that is constituted by the three winding bodies $22_1$, $22_2$, and $22_3$ is thereby assembled as shown in FIG. 15.

Winding bodies 22 are additionally mounted sequentially by aligning axial height positions and moving them circumferentially until the forty-seventh winding body $22_{47}$. As shown in FIG. 16, the assemblage 23 in which the forty-seven winding bodies $22_1$ through $22_{47}$ are assembled is increased in diameter to form a C shape that is wider than a circumferential width of the forty-eighth winding body $22_{48}$ between the first winding body $22_1$ and the forty-seventh winding body $22_{47}$.

Next, as shown in FIG. 17, the forty-eighth winding body $22_{48}$ is mounted onto an end near the forty-seventh winding body $22_{47}$. In addition, as shown in FIG. 18, an opening of the C-shaped assemblage 23 is closed, and the first winding body $22_1$ and the forty-eighth winding body $22_{48}$ are fitted together, to assemble the annular winding assembly 21 that is shown in FIG. 5. In the winding assembly 21 that is assembled in this manner, forty-eight columns of eight first and second rectilinear portions 22a and 22b that are lined up in a single column radially are arranged circumferentially at a pitch of one slot.

Figure 19:
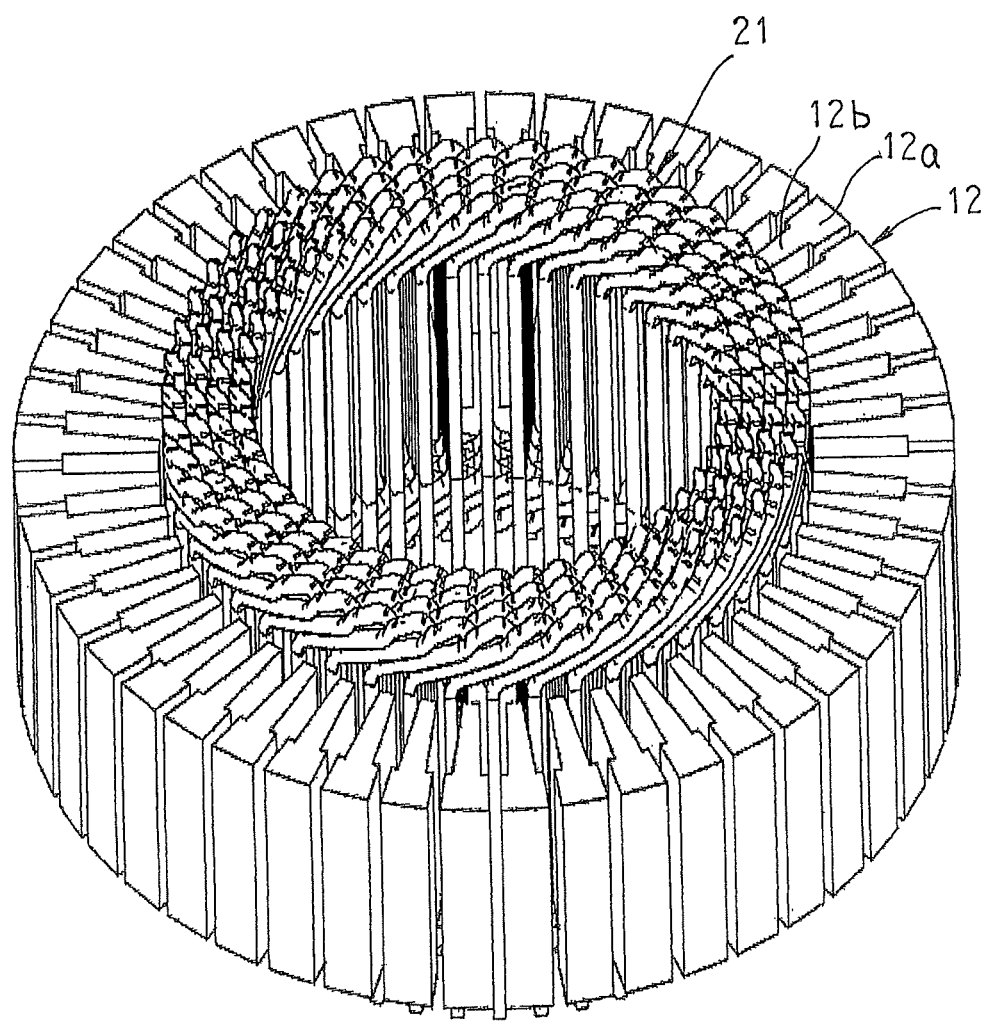
FIG. 19 is a diagram that explains a method for mounting the winding assembly into the armature core in the rotary electric machine according to Embodiment 1 of the present invention.
Figure 20:
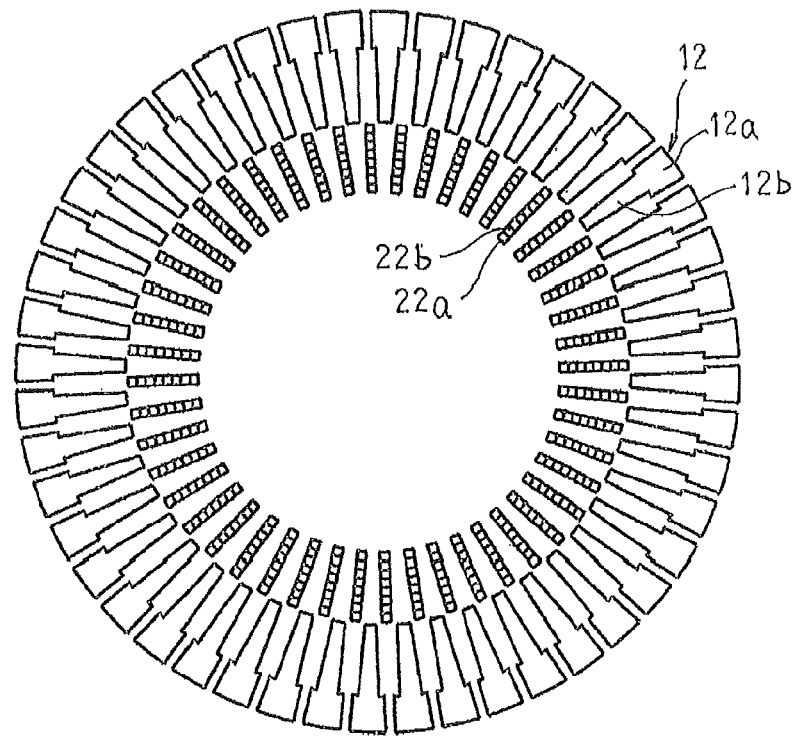
FIG. 20 is a diagram that explains the method for mounting the winding assembly into the armature core in the rotary electric machine according to Embodiment 1 of the present invention.
Figure 21:
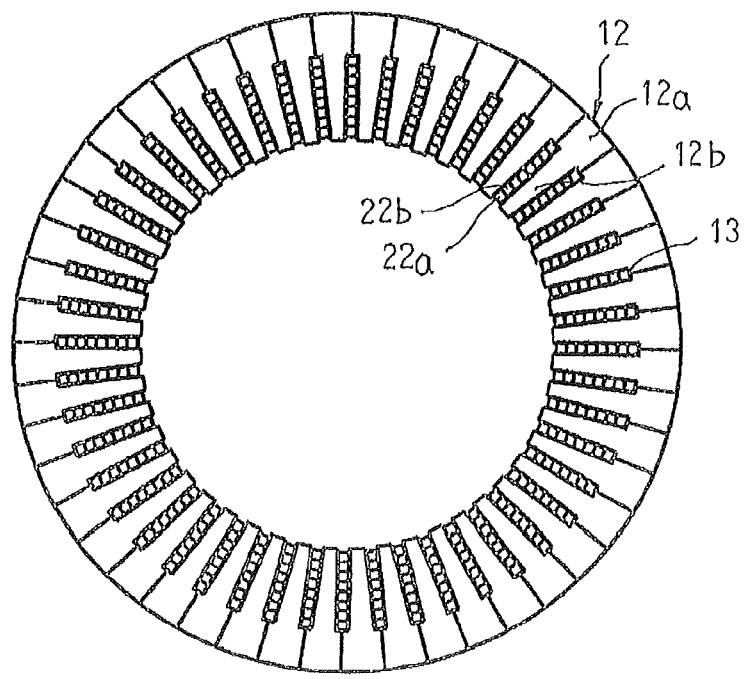
FIG. 21 is a diagram that explains the method for mounting the winding assembly into the armature core in the rotary electric machine according to Embodiment 1 of the present invention.
Figure 22:
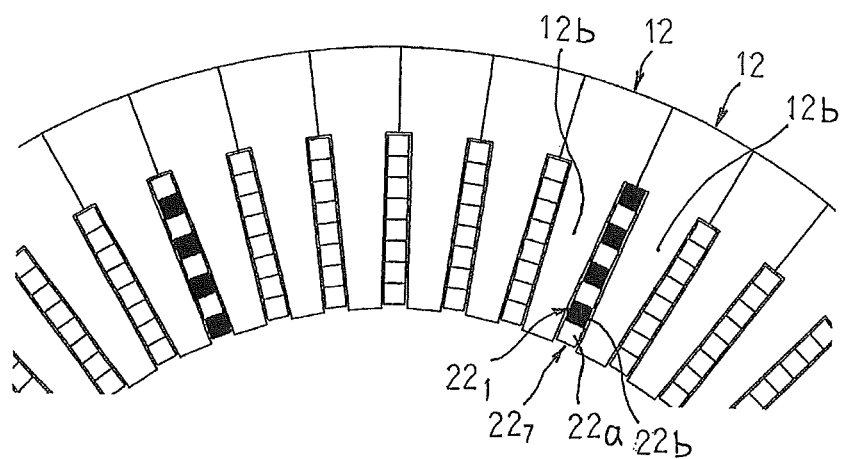
FIG. 22 is a diagram that explains the method for mounting the winding assembly into the armature core in the rotary electric machine according to Embodiment 1 of the present invention.
Figure 23:
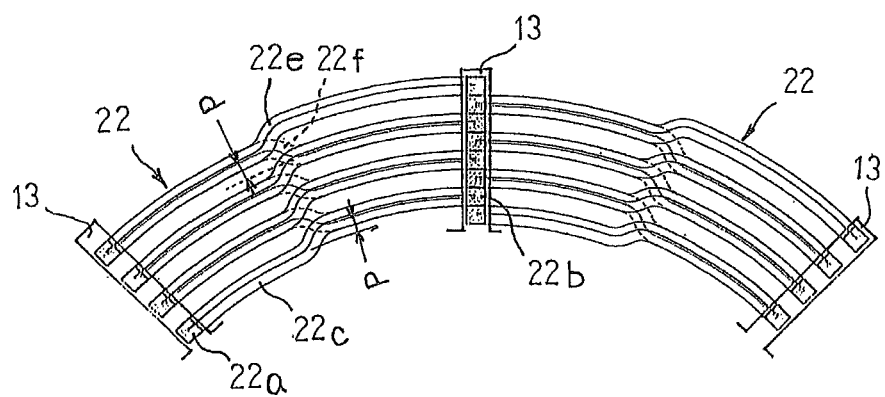
FIG. 23 is a partial end elevation of a state in which two winding bodies in the rotary electric machine according to Embodiment 1 of the present invention are mounted into the armature core so as to share a single slot when viewed from a side near a first axial end.
Figure 24:
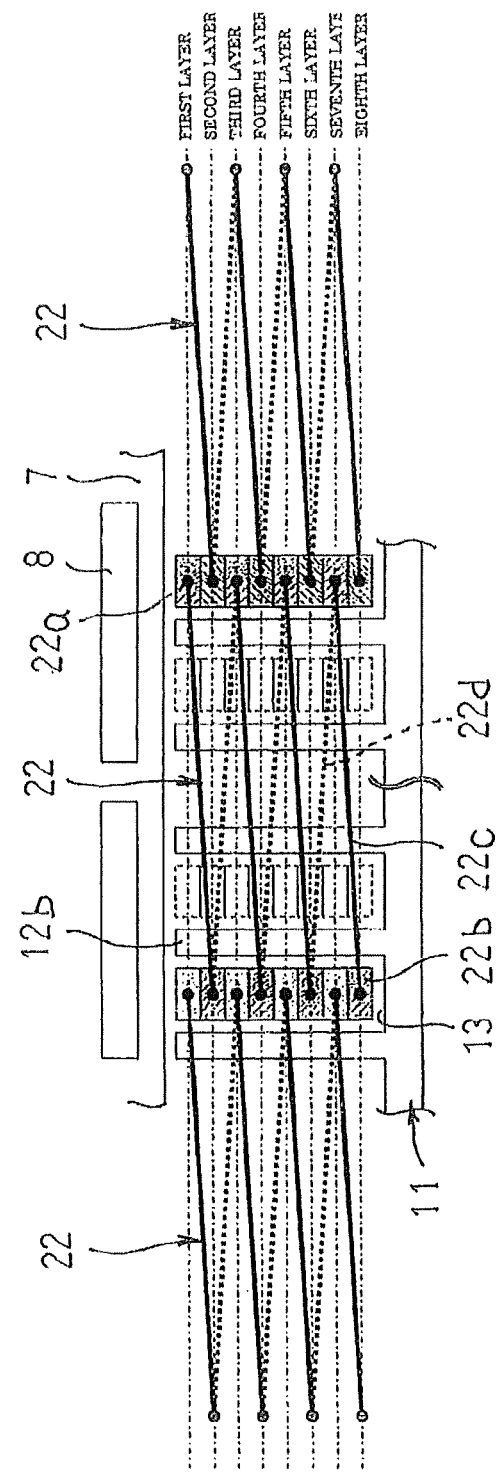
FIG. 24 is a developed projection of a state in which three winding bodies in the rotary electric machine according to Embodiment 1 of the present invention are mounted into identical slot groups of the armature core consecutively in a circumferential direction when viewed from a side near a first axial end.
Figure 25:
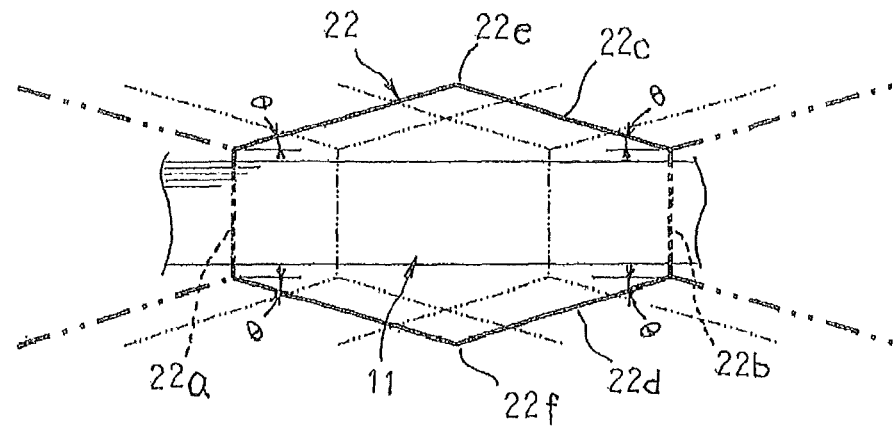
FIG. 25 is a developed projection that shows a state in which three winding bodies in the rotary electric machine according to Embodiment 1 of the present invention are mounted into identical slot groups of the armature core consecutively in the circumferential direction when viewed from radially outside.
Figure 26:
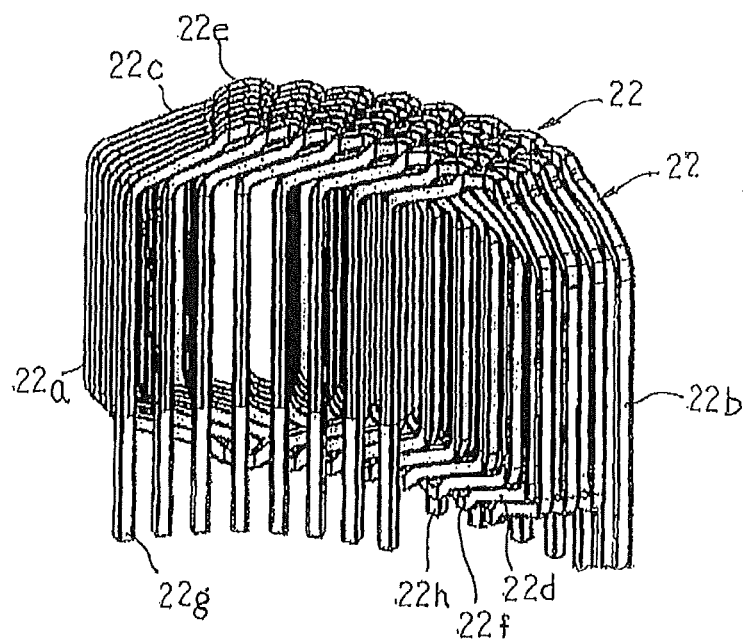
FIG. 26 is an oblique projection that shows a state in which eight winding bodies are arranged at a pitch of one slot in the circumferential direction in the rotary electric machine according to Embodiment 1 of the present invention.
Figure 27:
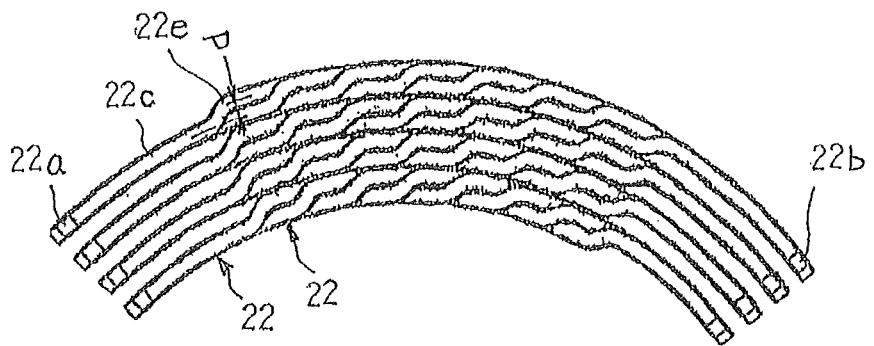
FIG. 27 is an end elevation of the state in which eight winding bodies are arranged at a pitch of one slot in the circumferential direction in the rotary electric machine according to Embodiment 1 of the present invention when viewed from a side near a first axial end.

Next, a method for mounting the winding assembly 21 onto the armature core 11 will be explained with reference to FIGS. 19 through 27. FIGS. 19 through 22 are diagrams that explain a method for mounting the winding assembly into the armature core in the rotary electric machine according to Embodiment 1 of the present invention, FIGS. 19 and 20 showing a state before the winding assembly is mounted, FIG. 21 showing a state after mounting of the winding assembly, and FIG. 22 showing the state after mounting of the winding assembly enlarged. FIG. 23 is a partial end elevation of a state in which two winding bodies in the rotary electric machine according to Embodiment 1 of the present invention are mounted into the armature core so as to share a single slot when viewed from a side near a first axial end, FIG. 24 is a developed projection of a state in which three winding bodies in the rotary electric machine according to Embodiment 1 of the present invention are mounted into identical slot groups of the armature core consecutively in a circumferential direction when viewed from a side near a first axial end, FIG. 25 is a developed projection that shows a state in which three winding bodies in the rotary electric machine according to Embodiment 1 of the present invention are mounted into identical slot groups of the armature core consecutively in the circumferential direction when viewed from radially outside, FIG. 26 is an oblique projection that shows a state in which eight winding bodies are arranged at a pitch of one slot in the circumferential direction in the rotary electric machine according to Embodiment 1 of the present invention, and FIG. 27 is an end elevation of the state in which eight winding bodies are arranged at a pitch of one slot in the circumferential direction in the rotary electric machine according to Embodiment 1 of the present invention when viewed from a side near a first axial end. Moreover, in FIGS. 20 through 22, for simplicity, only the first and second rectilinear portions 22a and 22b of the winding assembly 21 are shown. In FIG. 24, coil ends are also represented as straight lines for simplicity.

First, forty-eight core blocks 12 are arranged at an approximately uniform angular pitch circumferentially such that respective teeth are positioned on a radially outer side between adjacent columns of first and second rectilinear portions 22a and 22b of the winding assembly 21, as shown in FIGS. 19 and 20. Next, the core blocks 12 that are arranged circumferentially are simultaneously moved radially inward. The respective teeth 12b of the core blocks 12 are thereby inserted between the adjacent columns of first and second rectilinear portions 22a and 22b, and the circumferential side surfaces of the adjacent core blocks 12 are abutted with each other, preventing radially inward movement of the core blocks 12, and the winding assembly 21 is thereby mounted onto the armature core 11, as shown in FIGS. 20 and 21. Inside each of the slots 13, eight first and second rectilinear portions 22a and 22b are housed such that the long sides of the rectangular cross sections are oriented circumferentially so as to line up neatly in a single column in a radial direction.

Thus, by moving the core blocks 12 that are arranged in a row circumferentially radially inward so as to be inserted into the winding assembly 21, the first and second rectilinear portions 22a and 22b that are lined up irregularly in the radial direction are arranged neatly in a column by the movement that narrows the spacing between the teeth 12b of the adjacent core blocks 12. In addition, gaps between each of the first and second rectilinear portions 22a and 22b that are arranged neatly in a column in the radial direction are reduced and eliminated by the radially inward movement of the core back portions 12a of the core blocks 12. Thus, space factor of the conductor wires inside the slots 13 can be improved. Because the conductor wires inside the slots 13 and the core blocks 12 are in contact with each other, and heat transfer performance from the winding assembly 21, which constitutes a heat-generating body during passage of electric current, to the armature core 11 can be improved, temperature increases in the winding assembly 21 are suppressed, enabling increases in electrical resistance to be suppressed. Because the core blocks 12 are inserted such that the spacing between the adjacent teeth 12b becomes gradually narrower, sliding movement at contact surfaces between the armature winding 20 and the core blocks 12 is suppressed, enabling damage to insulating coatings of the conductor wires to be prevented.

Winding bodies 22 are configured such that first and second coil ends 22c and 22d are shifted at first and second top portions 22e and 22f in a radial direction so as to leave a gap d that is approximately equal to radial dimensions of the first and second rectilinear portions 22a and 22b. Thus, one winding body 22 can be mounted to another winding body 22 without interference by aligning the axial height positions and moving it toward the other winding body 22 circumferentially, enabling assembly of the winding assembly 21 to be improved.

In a step of inserting the teeth 12b of the core blocks 12 between the first and second rectilinear portions 22a and 22b from an outer circumferential side of the winding assembly 21, because tapered teeth 12b are inserted between each of the columns of first and second rectilinear portions 22a and 22b from radially outside and moved radially inward, the winding assembly 21 is mounted into the armature core 11 such that the first and second rectilinear portions 22a and 22b are arranged neatly into single columns.

In the winding assembly 21 that is mounted into the armature core 11 in this manner, two winding bodies 22 are each mounted into pairs of slots 13 that are positioned on two sides of six circumferentially consecutive teeth 12b so as to share one slot 13, as shown in FIGS. 23 through 25.

Now, focusing on a single winding body 22, a first coil end 22c that extends outward at the first axial end from a first rectilinear portion 22a in a first layer from a slot opening side of a first slot 13 extends toward a second slot 13 circumferentially at an angle of inclination θ, is shifted radially outward at a first top portion 22e so as to leave a gap d subsequently extends toward the second slot 13 circumferentially at a reverse angle of inclination θ, and is linked to a second rectilinear portion 22b in a second layer from the slot opening side of the second slot 13. Next, a second coil end 22d that extends outward at the second axial end from the second rectilinear portion 22b in the second layer from the slot opening side of the second slot 13 extends toward the first slot 13 circumferentially at an angle of inclination θ, is shifted radially outward at a second top portion 22f so as to leave a gap d, subsequently extends toward the first slot 13 circumferentially at a reverse angle of inclination θ, and is linked to a first rectilinear portion 22a in a third layer from the slot opening side of the first slot 13. Here, a radial direction corresponds to a slot depth direction.

In this manner, the first rectilinear portions 22a in the first, third, fifth, and seventh layers of the first slot 13 and the second rectilinear portions 22b in the second, fourth, sixth, and eight layers of the second slot 13 are each linked into a helical shape by the first and second coil ends 22c and 22d. Inclined portions that extend from end portions of the first and second rectilinear portions 22a and 22b to the first and second top portions 22e and 22f are formed so as to have an approximate circular arc shape when viewed from an axial direction. In the slot 13 that the two winding bodies 22 share, the first and second rectilinear portions 22a and 22b of the two winding bodies 22 are housed such that the long sides of the rectangular cross sections of the conductor wires are oriented circumferentially so as to line up alternately in a single column in the radial direction.

Now, FIGS. 26 and 27 show a state in which eight winding bodies 22 are arranged at a pitch of one slot in a circumferential direction when extracted. In FIG. 27, first coil ends 22c that extend outward from the first rectilinear portions 22a of the winding bodies 22 extend circumferentially so as to pass under the first coil ends 22c that extend outward from the first rectilinear portions 22a of the winding bodies 22 on the left, emerge immediately before reaching the first top portions 22e, shift at the first top portions 22e radially outward so as to leave a gap d, extend circumferentially so as to pass over the first coil ends 22c of the winding bodies 22 on the left, and are connected to second rectilinear portions 22b.

Similarly, although not depicted, at a rear surface in FIG. 27, second coil ends 22d that extend outward from the second rectilinear portions 22b of the winding bodies 22 extend circumferentially so as to pass over the second coil ends 22d that extend outward from the second rectilinear portions 22b of the winding bodies 22 on the left, shift at the second top portions 22f radially outward so as to leave a gap d, extend circumferentially so as to pass under the second coil ends 22d of the winding bodies 22 on the left, and are connected to first rectilinear portions 22a.

As shown in FIGS. 26 and 27, because the first and second rectilinear portions 22a and 22 are shifted radially by the first and second top portions 22e and 22f so as to leave a gap d, the eight winding bodies 22 can be arranged at a pitch of one slot in a circumferential direction without interfering with each other.

Figure 28:
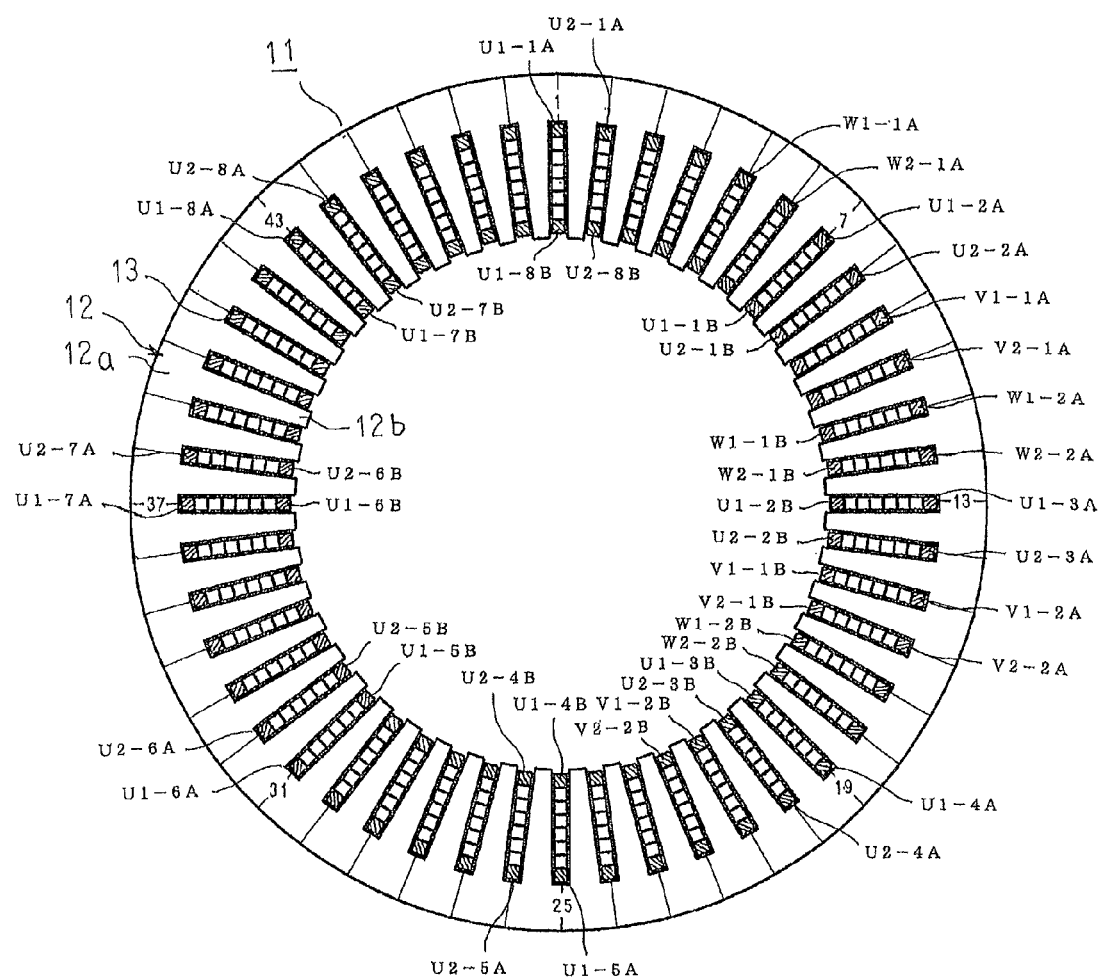
FIG. 28 is an end elevation of the armature in the rotary electric machine according to Embodiment 1 of the present invention when viewed from a side near a second axial end.
Figure 29:
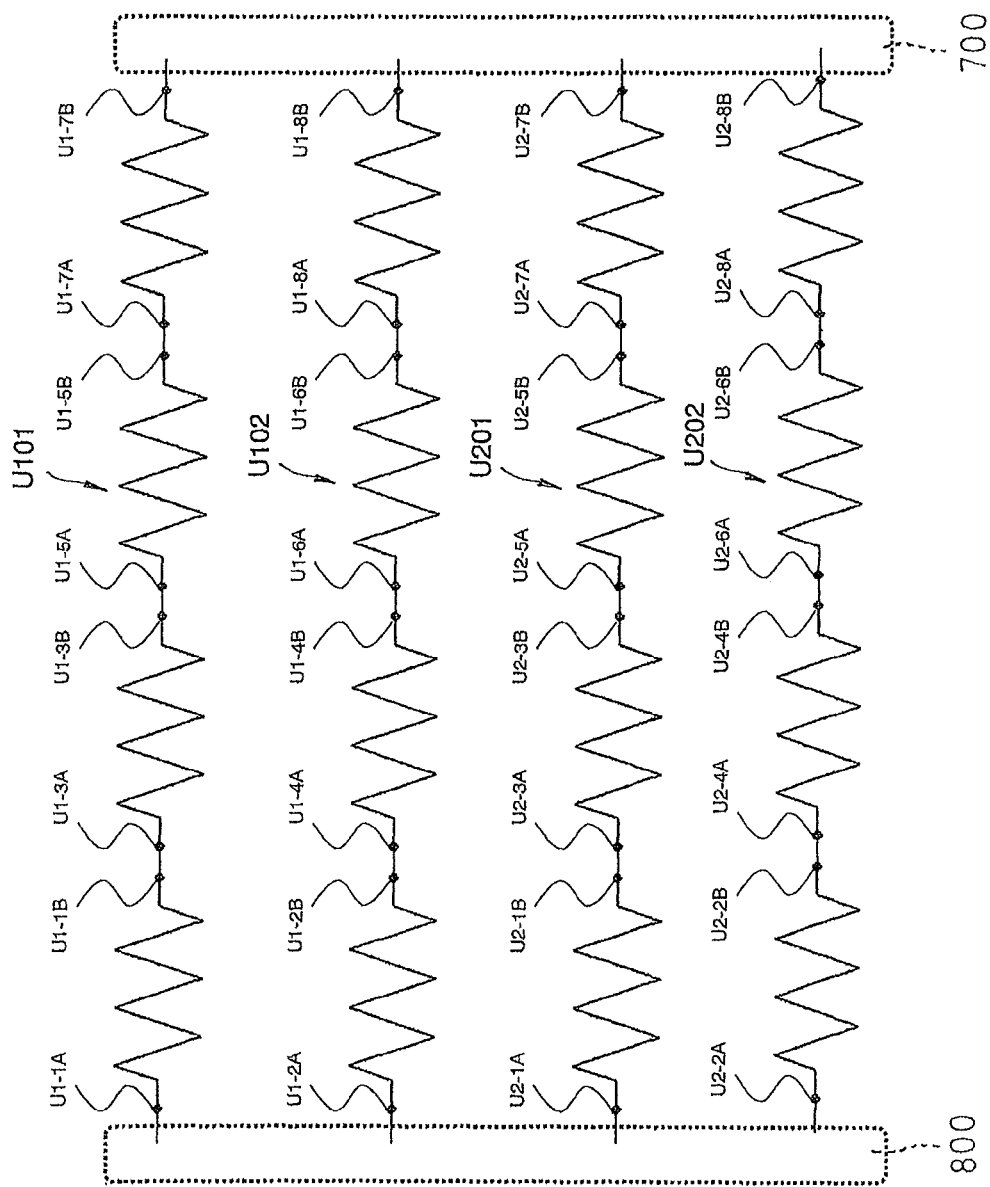
FIG. 29 is a connection diagram for small coil groups that constitute a U-phase coil of the armature winding in the rotary electric machine according to Embodiment 1 of the present invention.
Figure 30:
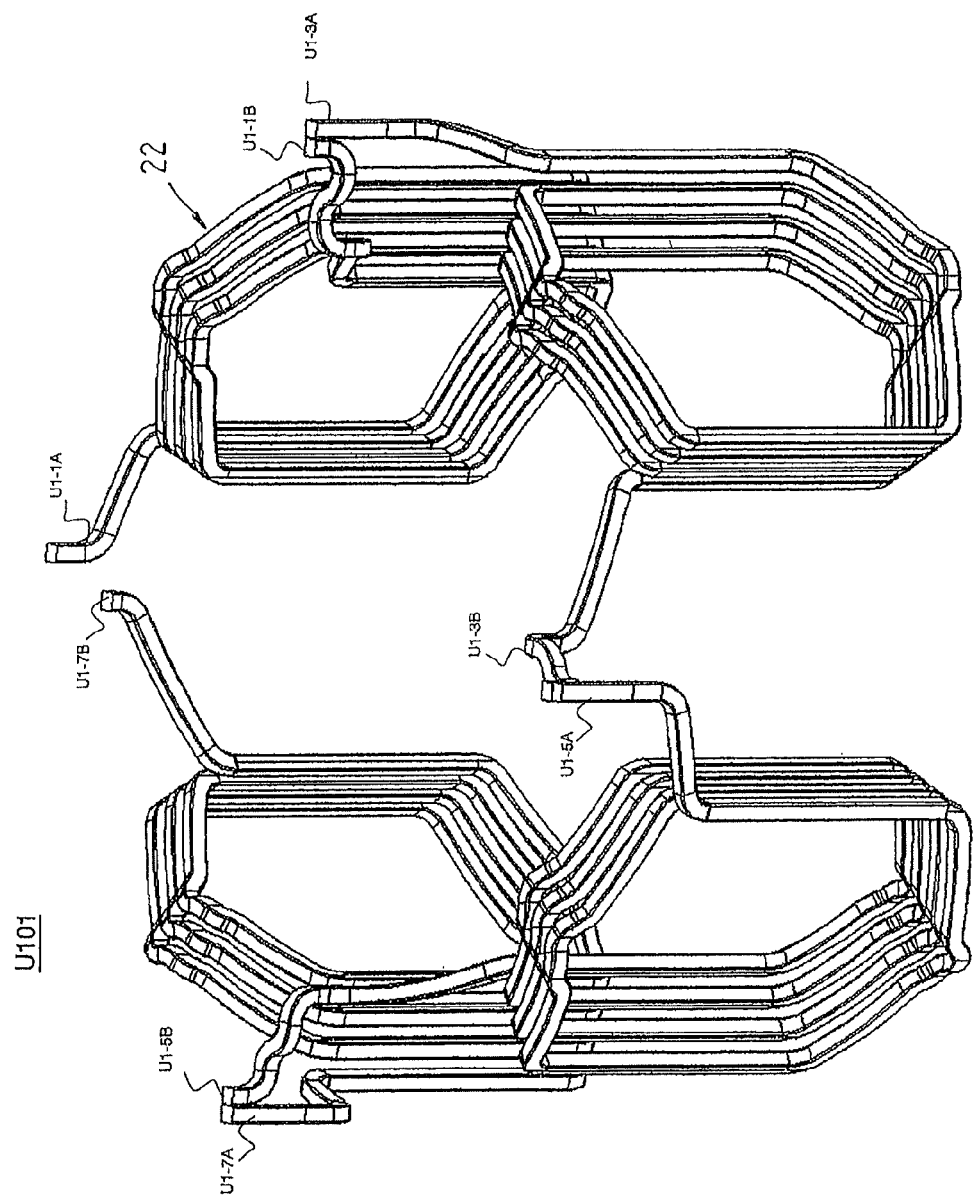
FIG. 30 is an oblique projection that shows the small coil groups that constitute the U-phase coil of the armature winding in the rotary electric machine according to Embodiment 1 of the present invention.
Figure 31:
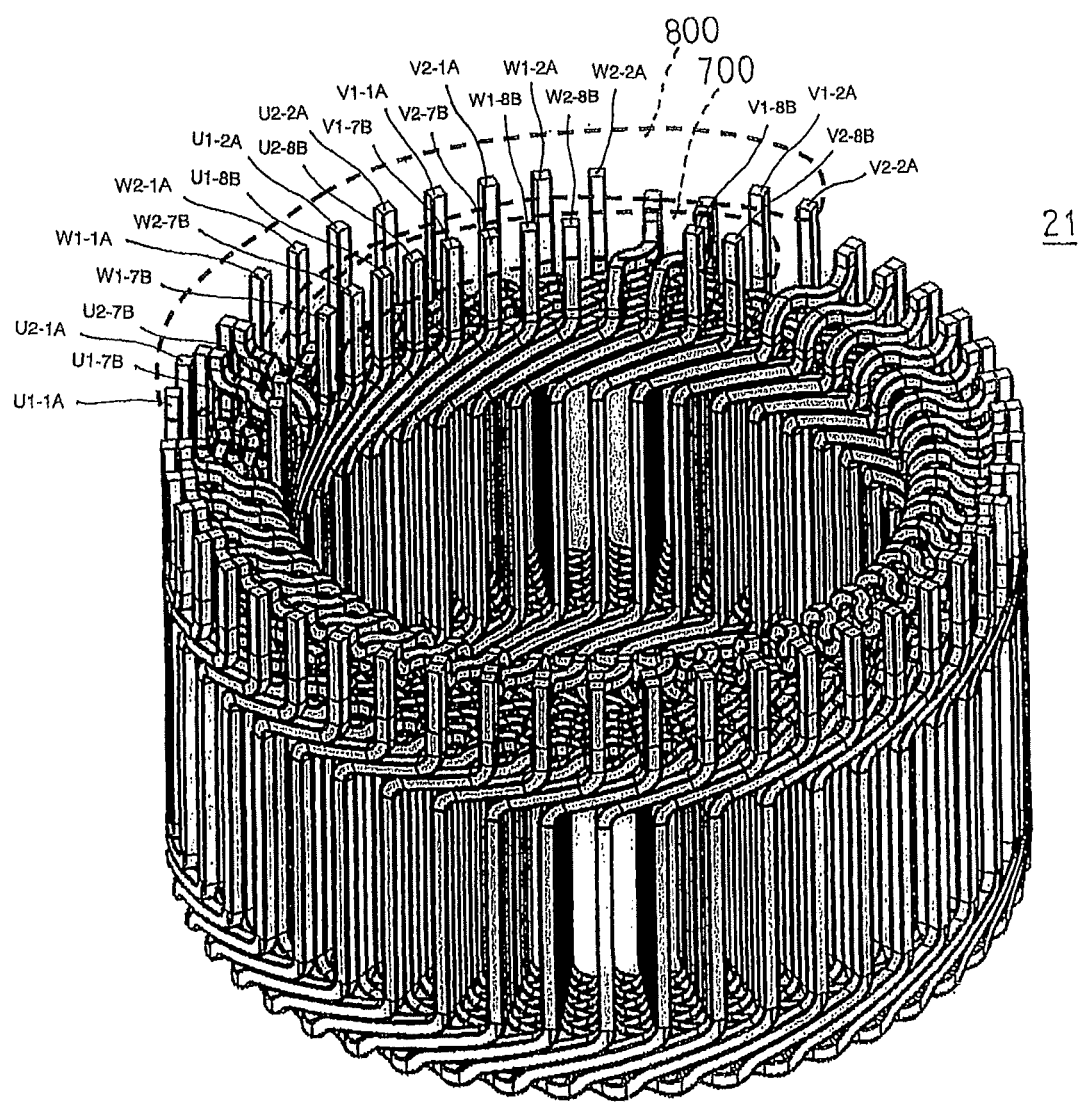
FIG. 31 is an oblique projection that shows an arranged state of small coil groups of the winding assembly in the rotary electric machine according to Embodiment 1 of the present invention.
Figure 32:
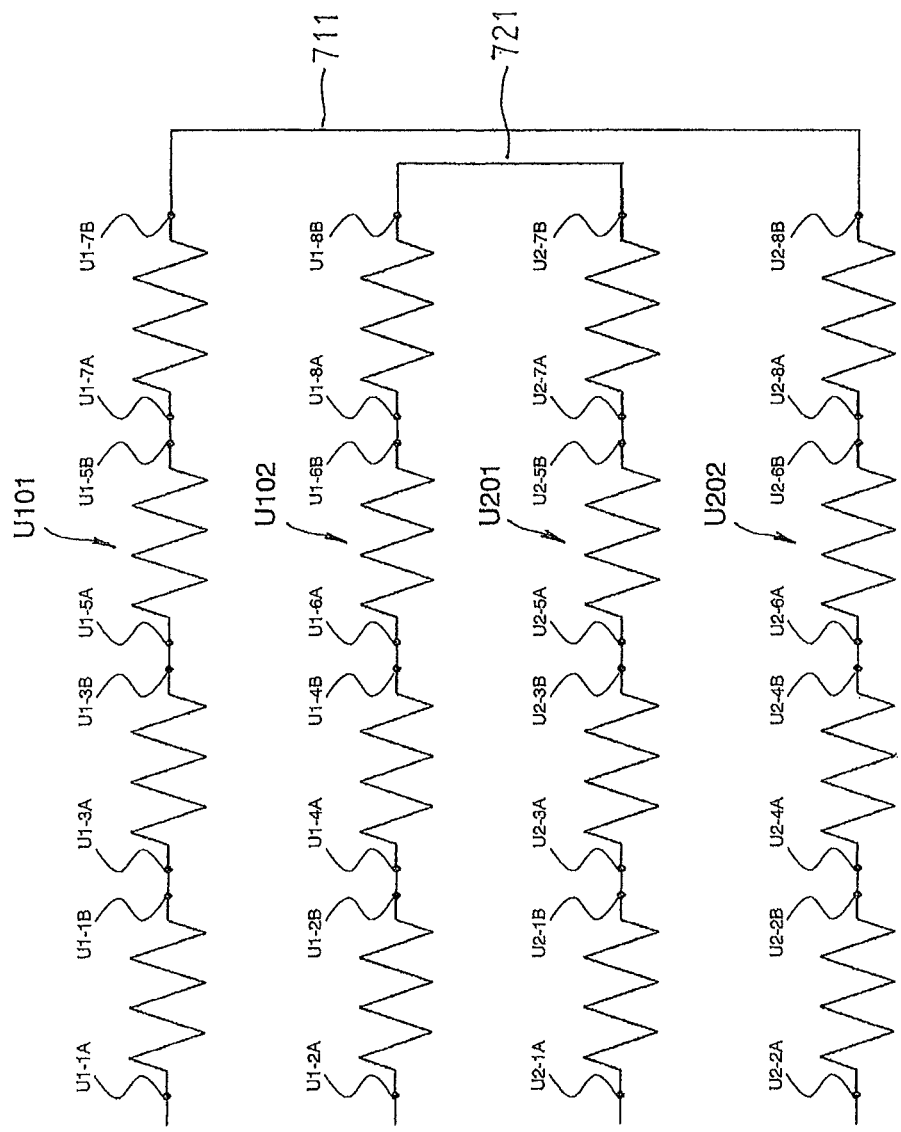
FIG. 32 is a connection diagram for a radially inner winding end group of the U-phase coil of the armature winding in the rotary electric machine according to Embodiment 1 of the present invention.
Figure 33:
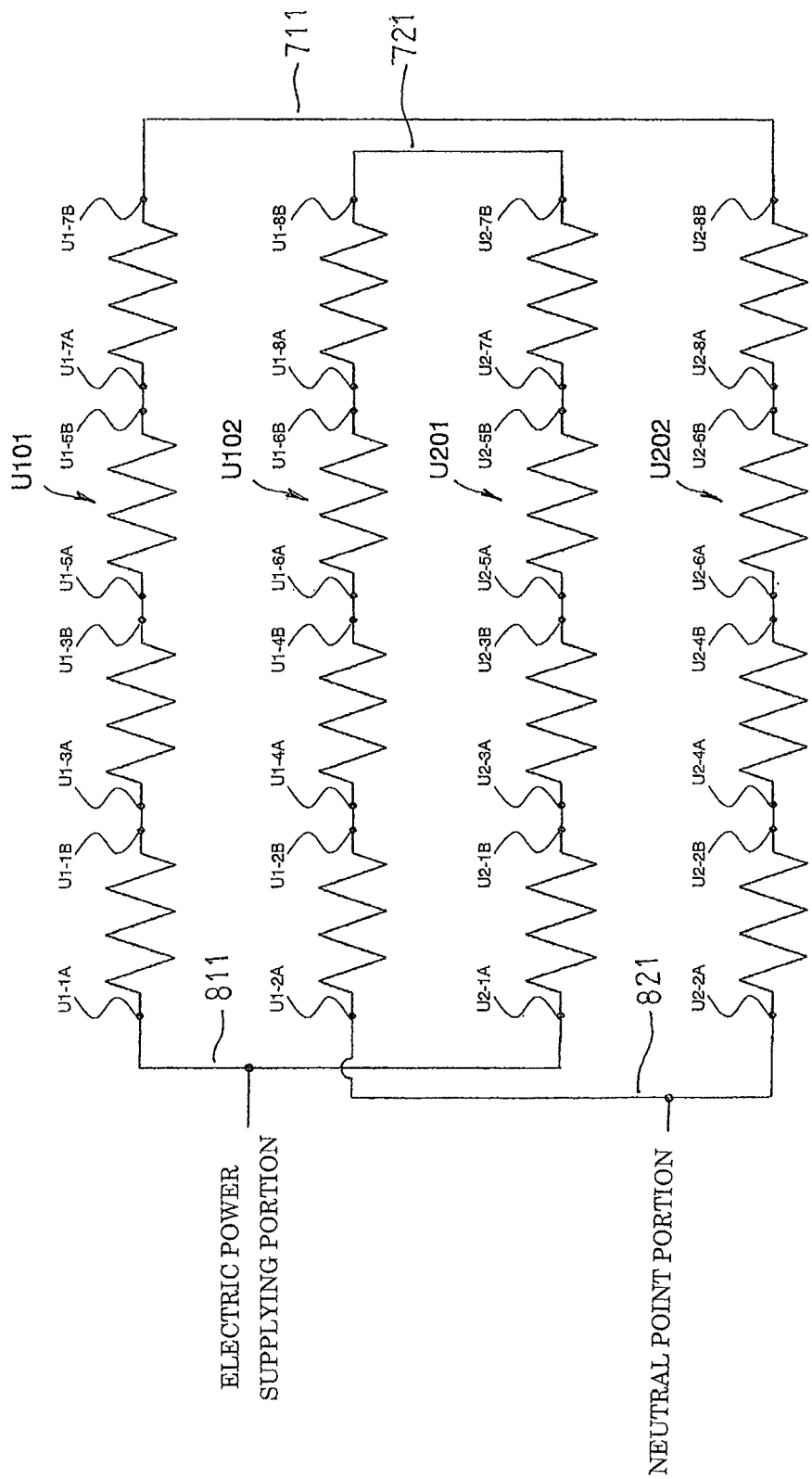
FIG. 33 is a first connection diagram for a radially outer winding end group of the U-phase coil of the armature winding in the rotary electric machine according to Embodiment 1 of the present invention.
Figure 34:
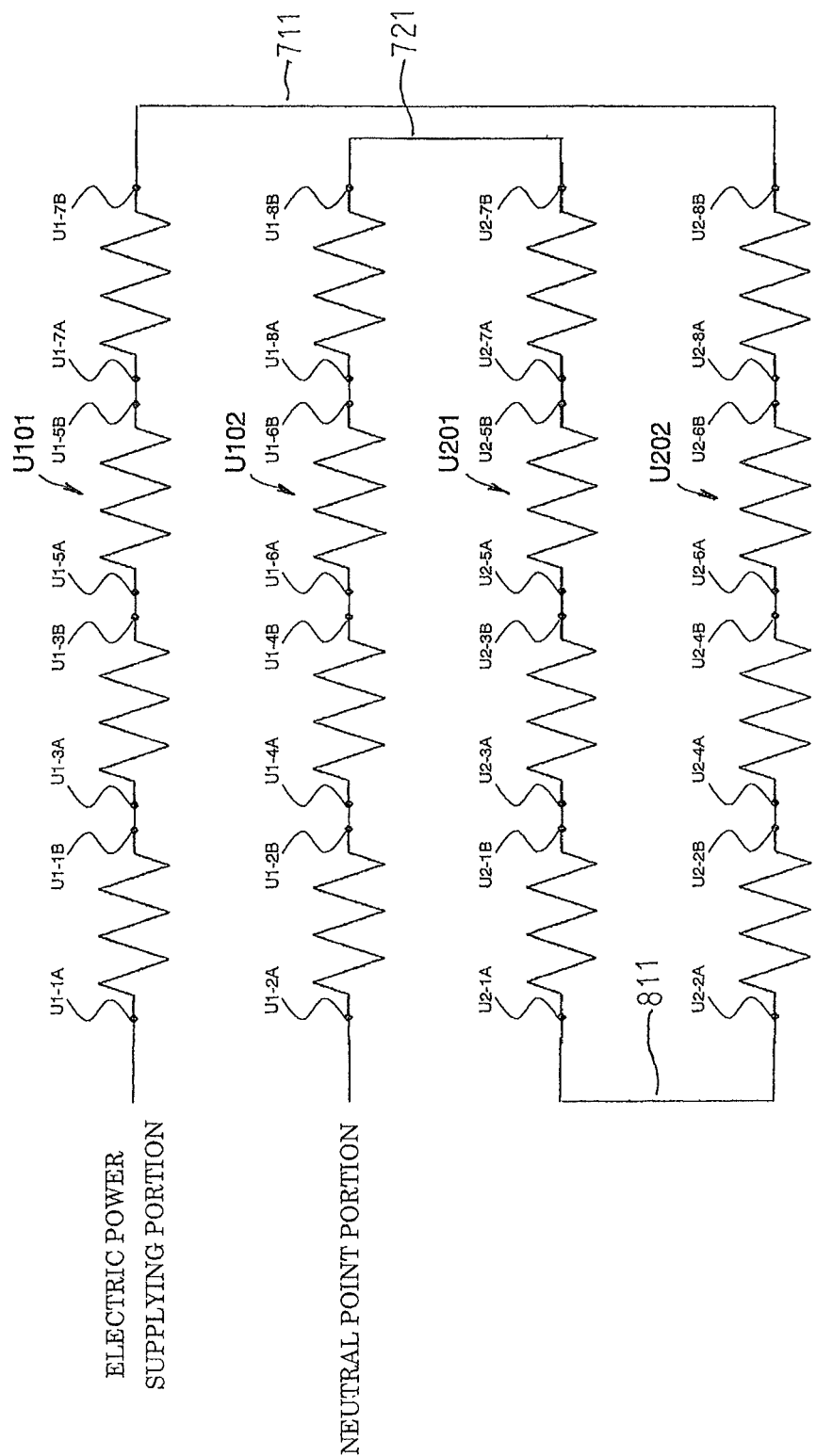
FIG. 34 is a second connection diagram for the radially outer winding end group of the U-phase coil of the armature winding in the rotary electric machine according to Embodiment 1 of the present invention.
Figure 35:
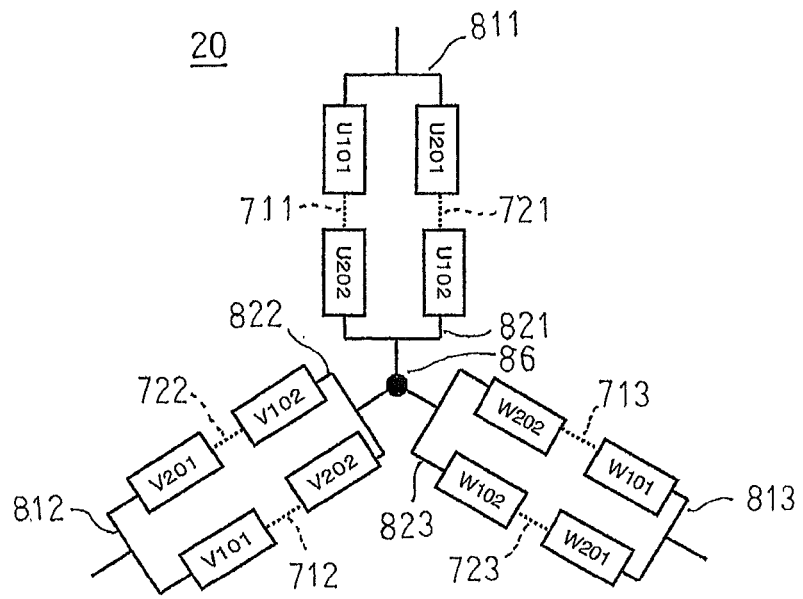
FIG. 35 is a first connection diagram for the armature winding in the rotary electric machine according to Embodiment 1 of the present invention.
Figure 36:
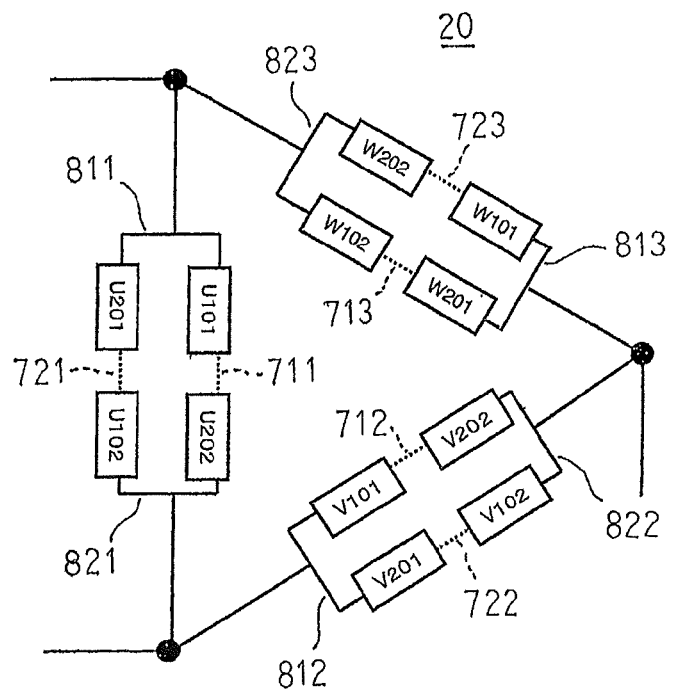
FIG. 36 is a second connection diagram for the armature winding in the rotary electric machine according to Embodiment 1 of the present invention.

Next, a connection method for the winding assembly 21 will be explained with reference to FIGS. 28 through 36. FIG. 28 is an end elevation of the armature in the rotary electric machine according to Embodiment 1 of the present invention when viewed from a side near a second axial end, FIG. 29 is a connection diagram for small coil groups that constitute a U-phase coil of the armature winding in the rotary electric machine according to Embodiment 1 of the present invention, FIG. 30 is an oblique projection that shows the small coil groups that constitute the U-phase coil of the armature winding in the rotary electric machine according to Embodiment 1 of the present invention, FIG. 31 is an oblique projection that shows an arranged state of small coil groups of the winding assembly in the rotary electric machine according to Embodiment 1 of the present invention, FIG. 32 is a connection diagram for a radially inner winding end group of the U-phase coil of the armature winding in the rotary electric machine according to Embodiment 1 of the present invention, FIG. 33 is a first connection diagram for a radially outer winding end group of the U-phase coil of the armature winding in the rotary electric machine according to Embodiment 1 of the present invention, FIG. 34 is a second connection diagram for the radially outer winding end group of the U-phase coil of the armature winding in the rotary electric machine according to Embodiment 1 of the present invention, FIG. 35 is a first connection diagram for the armature winding in the rotary electric machine according to Embodiment 1 of the present invention, and FIG. 36 is a second connection diagram for the armature winding in the rotary electric machine according to Embodiment 1 of the present invention. In FIG. 28, 1, 7, 13, etc., through 43 are slot numbers that have been allotted to the slots 13 sequentially in a circumferential direction.

First, in FIG. 28, U1-1A, U1-2A, etc., through U1-8A and U1-1B, U1-2B, etc., through U1-8B are winding ends of winding bodies 22 that constitute a U1 phase that is mounted into a group of slots 13 at Slot Numbers (1+6n), where n is a natural number that includes 0, and U2-1A, U2-2A, etc., through U2-8A and U2-1B, U2-2B, etc., through U2-8B are winding ends of winding bodies 22 that constitute a U2 phase that is mounted into a group of slots 13 at Slot Numbers (2+6n).

Winding bodies 22 are also mounted into a slot group at Slot Numbers (3+6n) to constitute a V1 phase, and winding bodies 22 are mounted into a slot group at Slot Numbers (4+6n) to constitute a V2 phase. Winding bodies 22 are also mounted into a slot group at Slot Numbers (5+6n) to constitute a W1 phase, and winding bodies 22 are mounted into a slot group at Slot Numbers (6+6n) to constitute a W2 phase. Here, to facilitate explanation, only V1-1A, V1-2A, V1-1B, and V1-2B (winding ends of the winding bodies 22 that constitute the V1 phase), V2-1A, V2-2A, V2-1B, and V2-2B (winding ends of the winding bodies 22 that constitute the V2 phase), W1-1A, W1-2A, W1-1B, and W1-1B (winding ends of the winding bodies 22 that constitute the W1 phase), and W2-1A, W2-2A, W2-1B, and W2-2B (winding ends of the winding bodies 22 that constitute the W2 phase) are shown.

Next, a method for connecting first through fourth small coil groups U101, U102, U201, and U202 that constitute a U-phase coil will be explained based on FIG. 29.

U1-1B and U1-3A, U1-3B and U1-5A, and U1-5B and U1-7A of winding bodies 22 that are separated by 360 electrical degrees are connected to produce the first small coil group U101. Similarly, U1-2B and U1-4A, U1-4B and U1-6A, and U1-6B and U1-8A of winding bodies 22 that are separated by 360 electrical degrees are connected to produce the second small coil group U102. Similarly, U2-1B and U2-3A, U2-3B and U2-5A, and U2-5B and U2-7A of winding bodies 22 that are separated by 360 electrical degrees are connected to produce the third small coil group U201. Similarly, U2-2B and U2-4A, U2-4B and U2-6A, and U2-6B and U2-8A of winding bodies 22 that are separated by 360 electrical degrees are connected to produce the fourth small coil group U202.

As shown in FIG. 30, the first small coil group U101 is configured by connecting four winding bodies 22 that are arranged so as to be 360 electrical degrees apart in a circumferential direction in series in order of circumferential arrangement. Thus, distances between winding ends 22g and 22h of the winding bodies 22 that are connected are shorter, enabling the winding bodies 22 to be connected to each other by extending the winding ends 22g and using them as crossover portions. The second through fourth small coil group U102, U201, and U202 are also configured by connecting four winding bodies 22 that are arranged so as to be 360 electrical degrees apart in a circumferential direction in series in order of circumferential arrangement. The first through fourth small coil groups U101, U102, U201, and U202 are each revolution coils that are mounted so as to make approximately one round (360 mechanical degrees) circumferentially around the armature core 11. Although not shown, a V-phase coil and a W-phase coil are also configured in a similar or identical manner.

FIG. 31 is an oblique projection of a winding assembly 21 that is configured by connecting winding bodies 22 that are lined up as shown in the end elevation in FIG. 28 based on the connection diagram for the small coil groups in FIG. 29. The winding ends 22g of twelve small coil groups respectively project axially outward from a radially inner side of the winding assembly 21 and are arranged circumferentially to constitute a radially inner winding end group 700. The winding ends 22h of twelve small coil groups also respectively project axially outward from a radially outer side of the winding assembly 21 and are arranged circumferentially to constitute a radially outer winding end group 800.

Now, in Embodiment 1, because the number of slots per phase per pole q is two, and the number of poles p is eight, and the number y of winding bodies 22 that are housed in one slot 13 is two, the number of small coil groups per phase (y×q) is four, making the number of winding bodies 22 that constitute each of the small coil groups that are connected in series four (p/2).

According to Embodiment 1, because the small coil groups that constitute each of the phase coils are each configured by connecting four winding bodies 22 that are arranged so as to be 360 electrical degrees apart in a circumferential direction in series in order of circumferential arrangement, crossover portions that connect the winding bodies 22 together do not over lap with each other axially. Thus, enlargement of axial dimensions of the coil ends is suppressed, enabling downsizing of the rotary electric machine 100 to be achieved. Because the lengths of the crossover portions that connect the winding bodies 22 together are shorter, reductions in resistance and reductions in copper loss are enabled in each of the phase coils that constitute the armature winding 20, enabling increased efficiency and reductions in weight to be achieved in the rotary electric machine 100.

Next, methods for connecting the armature winding 20 will be explained based on FIGS. 32 through 36.

First, a method for connecting the radially inner winding end group 700 in the first through fourth small coil groups U101, U102, U201, and U202 that constitute a U-phase coil will be explained using FIG. 32.

U1-7B, which is a radially inner winding end of the first small coil group U101, and U2-8B, which is a radially inner winding end of the fourth small coil group U202, are connected using a crossover wire 711 such that the first small coil group U101 and the fourth small coil group U202 are connected in series. Next, U1-8B, which is a radially inner winding end of the second small coil group U102, and U2-7B, which is a radially inner winding end of the third small coil group U201, are connected using a crossover wire 721 such that the second small coil group U102 and the third small coil group U201 are connected in series. The V-phase coil and the W-phase coil are also connected using crossover wires 712, 713, 722, and 723 in a similar manner. Connection of all of the winding ends of the radially inner winding end group 700 is thereby completed by connection between winding ends within the radially inner winding end group 700.

The first and second small coil groups U101 and U102 and the third and fourth small coil groups U201 and U202 are housed in slots 13 that are offset by 30 electrical degrees. Thus, a reverse electromotive force from the rotor 5 that is offset in phase by 30 electrical degrees compared to the first and second small coil groups U101 and U102 arises in the third and fourth small coil groups U201 and U202. Because of that, if the first and second small coil groups U101 and U102 are connected in series by connecting U1-7B and U1-8B, and the third and fourth small coil groups U201 and U202 are connected in series by connecting U2-7B and U2-8B, and in addition U1-1A and U2-1A are connected and U1-2A and U2-2A are connected to configure a parallel circuit, then an electric current is generated due to the phase difference in the reverse electromotive force. This electric current constitutes a cause of deterioration in efficiency. In Embodiment 1, because small coil groups that are housed in slots 13 that are offset by an electrical angle of π+30 degrees are connected to each other in series, the generation of electric currents that result from phase differences is suppressed.

In addition, although not shown, if the number of slots per phase per pole q is three, then the three slot groups in which the U-phase coil is housed, for example, are offset from each other by an electrical angle of 20 degrees ($=\pi \times p/S$). The generation of electric currents that result from phase differences can be suppressed if small coil groups that are housed in slots 13 that are offset by an electrical angle of π±20 degrees are connected in series, or if small coil groups that are housed in slots 13 that are offset by an electrical angle of π±40 degrees are connected in series. Thus, in order to suppress the generation of electric currents that result from phase differences, small coil groups that are housed in slots 13 that are offset by an electrical angle of $\pi \pm (\pi \times p/S) \times l$, where l is a natural number that satisfies $0 < l \leq q-1$, should be connected in series.

Next, methods for connecting the radially outer winding end group 800 in the first through fourth small coil groups U101, U102, U201, and U202 that constitute a U-phase coil will be explained using FIGS. 33 and 34.

As shown in FIG. 33, U1-1A, which is a radially outer winding end of the first small coil group U101, and U2-1A, which is a radially outer winding end of the third small coil group U201, are connected using a crossover wire 811, and U1-2A, which is a radially outer winding end of the second small coil group U102, and U2-2A, which is a radially outer winding end of the fourth small coil group U202, are connected using a crossover wire 821. A U-phase coil is obtained thereby that is configured into a parallel circuit in which coils in each of which eight winding bodies 22 are connected in series are connect in parallel. The V-phase coil and the W-phase coil are also connected using crossover wires 812, 813, 822, and 823 in a similar manner such that connection of all of the winding ends of the radially outer winding end group 800 is thereby completed by connection between winding ends within the radially outer winding end group 800.

Alternatively, as shown in FIG. 34, U2-1A, which is a radially outer winding end of the third small coil group U201, and U2-2A, which is a radially outer winding end of the fourth small coil group U202, are connected using the crossover wire 811 to obtain a U-phase coil that is configured into a series circuit by connecting sixteen winding bodies 22 in series. The V-phase coil and the W-phase coil are also connected in a similar manner such that connection of all of the winding ends of the radially outer winding end group 800 is thereby completed by connection between winding ends within the radially outer winding end group 800.

Because the circuits of each of the phase coils can thereby be changed to parallel or series simply by changing connections among the winding ends of identical-phase coils within the radially outer winding end group 800 without changing connections among the winding ends within the radially inner winding end groups 700, modifications to specifications of the armature winding 20 can be accommodated easily. Thus, increases in the number of parts and steep rises in manufacturing costs that result from modification of connections becoming complicated can be suppressed.

Next, methods for connecting the U-phase coil, the V-phase coil, and the W-phase coil will be explained using FIGS. 35 and 36.

As shown in FIG. 35, a distributed-winding armature winding 20 in which the U-phase coil, the V-phase coil, and the W-phase coil are wye-connected is obtained by connecting the crossover wires 821, 822, and 823 of the U-phase coil, the V-phase coil, and the W-phase coil, which are configured into parallel circuits, to a neutral point 86, and making the crossover wires 811, 812, and 813 of the U-phase coil, the V-phase coil, and the W-phase coil into electric power supplying portions.

Alternatively, as shown in FIG. 36, a distributed-winding armature winding 20 in which the U-phase coil, the V-phase coil, and the W-phase coil are delta-connected is obtained by connecting the crossover wire 821 of the U-phase coil and the crossover wire 812 of the V-phase coil, connecting the crossover wire 822 of the V-phase coil and the crossover wire 813 of the W-phase coil, and connecting the crossover wire 823 of the W-phase coil and the crossover wire 811 of the U-phase coil.

A rotary electric machine 100 that uses the armature winding 20 that is connected in this manner operates as an eight-pole forty-eight-slot inner-rotor three-phase motor when set alternating-current power is supplied to the armature winding 20.

Because the connection of the phase coils can thereby be changed to wye connection or delta connection simply by changing connections among the winding ends of different-phase coils within the radially outer winding end group 800 without changing connections among the winding ends within the radially inner winding end groups 700, modifications to specifications of the armature winding 20 can be accommodated easily. Thus, increases in the number of parts and steep rises in manufacturing costs that result from modification of connections becoming complicated can be suppressed.

Because connection of all of the winding ends of the radially inner winding end group 700 is completed by connection between winding ends within the radially inner winding end group 700, and connection of all of the winding ends of the radially outer winding end group 800 is completed by connection between winding ends within the radially outer winding end group 800, the crossover wires that connect the small coil groups together extend circumferentially without being led around from the radially outer side to the radially inner side, or from the radially inner side to the radially outer side. Thus, enlargement of axial dimensions of the armature winding 20 can be suppressed, enabling downsizing of the rotary electric machine 100 to be achieved.

Figure 37:
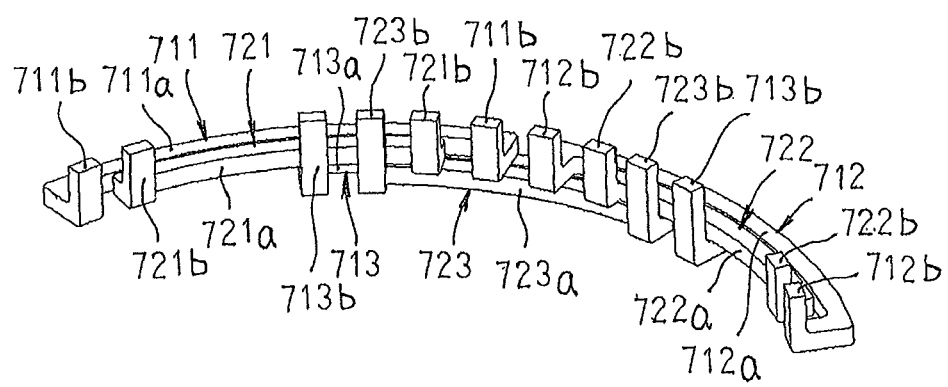
FIG. 37 is an oblique projection that shows connecting members that link together winding ends within the radially inner winding end group in the rotary electric machine according to Embodiment 1 of the present invention.

Next, a case in which a U-phase coil, a V-phase coil, and a W-phase coil that are configured into series circuits by connecting sixteen winding bodies 22 in series are wye-connected will be explained. FIG. 37 is an oblique projection that shows connecting members that link together winding ends within the radially inner winding end group in the rotary electric machine according to Embodiment 1 of the present invention, FIG. 38 is an oblique projection that shows connecting members that link together winding ends within the radially outer winding end group in the rotary electric machine according to Embodiment 1 of the present invention, and FIG. 39 is an oblique projection that shows a winding assembly that is connected using the connecting members in the rotary electric machine according to Embodiment 1 of the present invention.

The crossover wires 711, 712, 713, 721, 722, and 723 that connect together the winding ends within the radially inner winding end group 700 are produced by press-molding a conductor sheet that is made of copper, for example, and as shown in FIG. 37, include: circular arc-shaped base portions 711a, 712a, 713a, 721a, 722a, and 723a; and L-shaped connecting terminals 711b, 712b, 713b, 721b, 722b, and 723b that are disposed so as to extend radially inward from two ends of the base portions 711a, 712a, 713a, 721a, 722a, and 723a.

Figure 38:
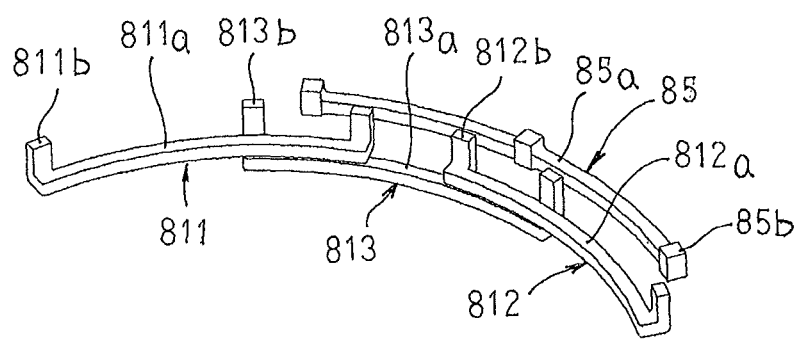
FIG. 38 is an oblique projection that shows connecting members that link together winding ends within the radially outer winding end group in the rotary electric machine according to Embodiment 1 of the present invention.
Figure 39:
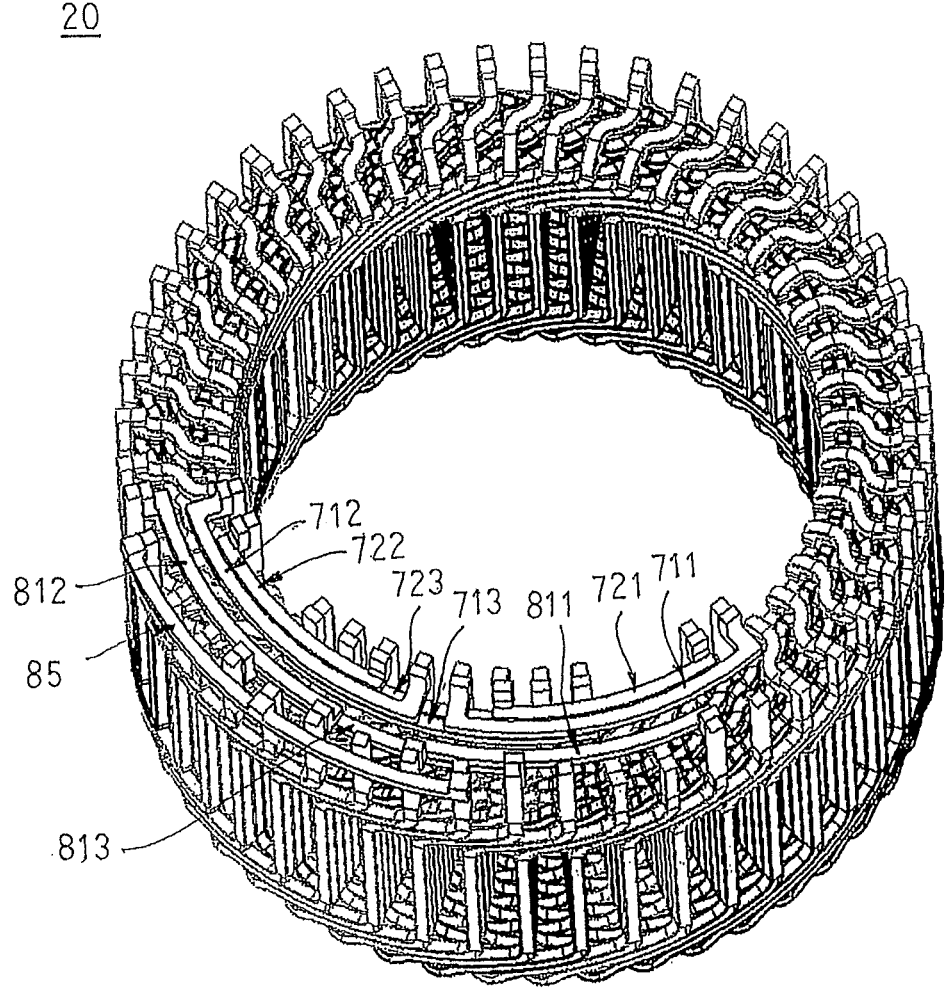
FIG. 39 is an oblique projection that shows a winding assembly that is connected using the connecting members in the rotary electric machine according to Embodiment 1 of the present invention.

The crossover wires 811, 812, and 813 that connect together the winding ends within the radially outer winding end group 800 are produced by press-molding a conductor sheet that is made of copper, for example, and as shown in FIG. 38, include: circular arc-shaped base portions 811a, 812a, and 813a; and L-shaped connecting terminals 811b, 812b, and 813b that are disposed so as to extend radially inward from two ends of the base portions 811a, 812a, and 813a. In addition, a neutral point crossover wire 85 is produced by press-molding a conductor sheet made of copper, for example, and as shown in FIG. 38, includes: a circular arc-shaped base portion 85a; and connecting terminals 85b that are disposed so as to protrude from the base portion 85a.

The base portion 711a of the crossover wire 711 is disposed axially outside the coil ends of the winding assembly 21, and the connecting terminals 711b are joined to U1-7B and U2-8B. The base portion 712a of the crossover wire 712 is disposed axially outside the coil ends of the winding assembly 21, and the connecting terminals 712b are joined to V1-7B and V2-8B. The base portion 713a of the crossover wire 713 is disposed axially outside the coil ends of the winding assembly 21, and the connecting terminals 713b are joined to W1-7B and W2-8B. In addition, the base portion 721a of the crossover wire 721 is disposed axially outside the coil ends of the winding assembly 21, and the connecting terminals 721b are joined to U2-7B and U1-8B. The base portion 722a of the crossover wire 722 is disposed axially outside the coil ends of the winding assembly 21, and the connecting terminals 722b are joined to V2-7B and V1-8B. The base portion 723a of the crossover wire 723 is disposed axially outside the coil ends of the winding assembly 21, and the connecting terminals 723b are joined to W2-7B and W1-8B. Connection among the winding ends within the radially inner winding end group 700 is completed thereby.

Next, the base portion 811a of the crossover wire 811 is disposed axially outside the coil ends of the winding assembly 21, and the connecting terminals 811b are joined to U2-1A and U2-2A. The base portion 812a of the crossover wire 812 is disposed axially outside the coil ends of the winding assembly 21, and the connecting terminals 812b are joined to V2-1A and V2-2A. The base portion 813a of the crossover wire 813 is disposed axially outside the coil ends of the winding assembly 21, and the connecting terminals 813b are joined to W2-1A and W2-2A. In addition, the base portion 85a of the neutral point crossover wire 85 is disposed axially outside the coil ends of the winding assembly 21, and the connecting terminals 85b are joined to U1-2A, V1-2A, and W1-2A. Connection among the winding ends within the radially outer winding end group 800 is completed thereby.

As shown in FIG. 39, the winding assembly 21 is connected by the crossover wires 711, 712, 713, 721, 722, 723, 811, 812, and 813, and the neutral point crossover wire 85, to configure an armature winding 20 in which a U-phase coil, a V-phase coil, and a W-phase coil that are each configured into a series circuit are wye-connected.

Thus, because connection of all of the winding ends of the radially inner winding end group 700 is completed by connection between winding ends within the radially inner winding end group 700, and connection of all of the winding ends of the radially outer winding end group 800 is completed by connection between winding ends within the radially outer winding end group 800, the winding assembly 21 can be connected simply using press-formed connecting members as the crossover wires 711, 712, 713, 721, 722, 723, 811, 812, and 813 and the neutral point crossover wire 85.

Moreover, in Embodiment 1 above, winding ends within the radially outer winding end group 800 are explained as being made electric power supplying portions, but it goes without saying that winding ends within the radially inner winding end group 700 may be made electric power supplying portions.

In Embodiment 1 above, insulation between the weld portions of the first and second winding ends 22g and 22h of the winding bodies 22 is not described at all, but an electrically insulating resin should be applied to the weld portions, for example.

In Embodiment 1 above, core blocks 12 in which the annular armature core 11 is divided into forty-eight equal sections, in which a single tooth 12b is disposed so as to protrude from a circular arc-shaped core back portion 12a, are used, but core blocks may be used in which two core blocks 12 are produced integrally in a single body, i.e., in which two teeth are disposed so as to protrude from a circular arc-shaped core back portion. In that case, workability during assembly of the armature 10 is improved because the number of the core blocks is reduced to half.

Embodiment 2

Figure 40:
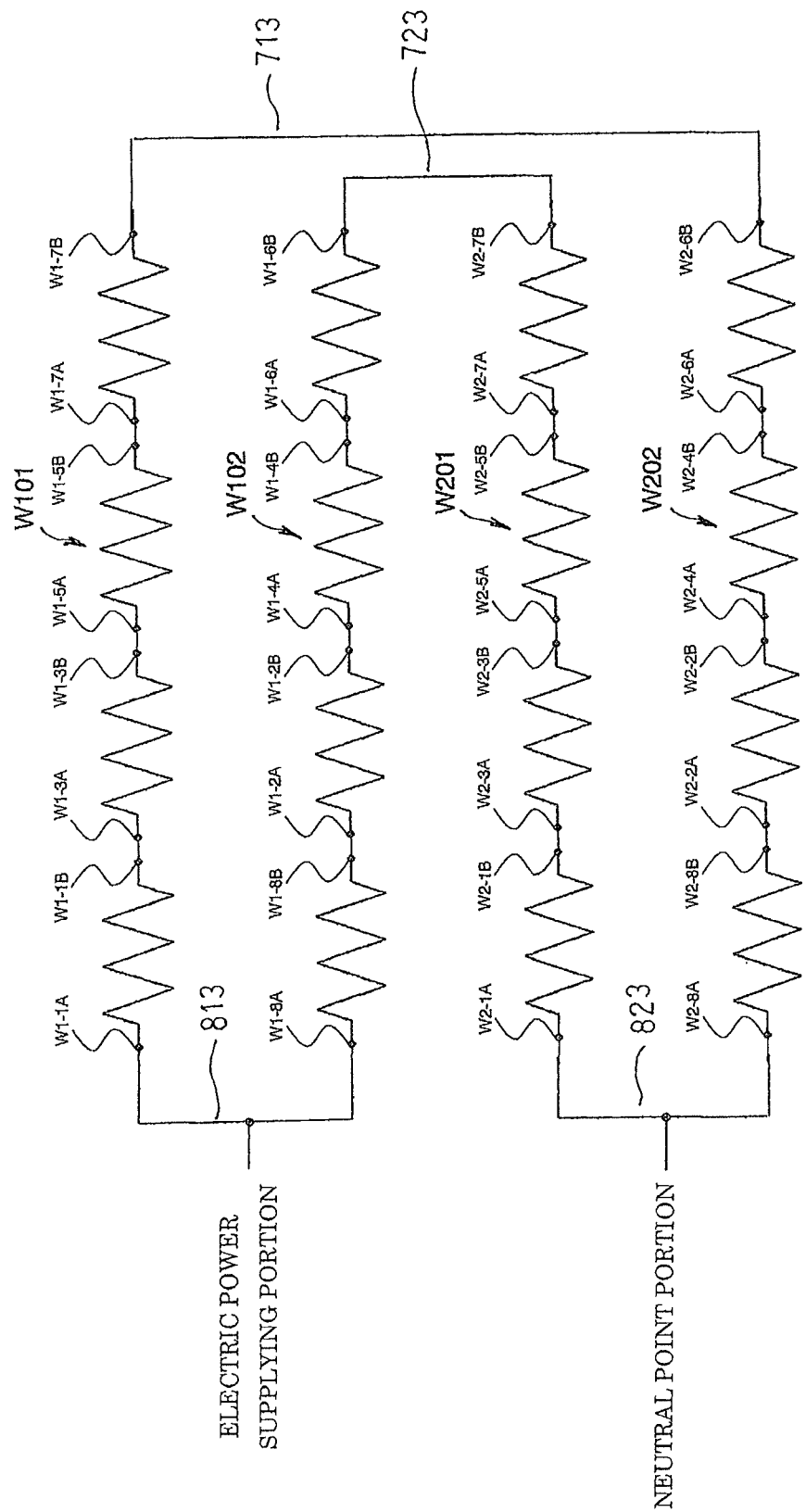
FIG. 40 is a connection diagram for small coil groups that constitute a W-phase coil of an armature winding in a rotary electric machine according to Embodiment 2 of the present invention.

FIG. 40 is a connection diagram for small coil groups that constitute a W-phase coil of an armature winding in a rotary electric machine according to Embodiment 2 of the present invention.

First, a method for connecting first through fourth small coil groups W101, W102, W201, and W202 that constitute a W-phase coil will be explained based on FIG. 40.

W1-1B and W1-3A, W1-3B and W1-5A, and W1-5B and W1-7A of winding bodies 22 that are separated by 360 electrical degrees are connected to produce the first small coil group W101. Similarly, W1-8B and W1-2A, W1-2B and W1-4A, W1-4B and W1-6A of winding bodies 22 that are separated by 360 electrical degrees are connected to produce the second small coil group W102. Similarly, W2-1B and W2-3A, W2-3B and W2-5A, W2-5B and W2-7A of winding bodies 22 that are separated by 360 electrical degrees are connected to produce the third small coil group W201. Similarly, W2-8B and W2-2A, W2-2B and W2-4A, W2-4B and W2-6A of winding bodies 22 that are separated by 360 electrical degrees are connected to produce the fourth small coil group W202. Although not shown, a V-phase coil and a U-phase coil are also configured in a similar or identical manner to those of Embodiment 1 above.

Next, W1-7B, which is a radially inner winding end of the first small coil group W101, and W2-6B, which is a radially inner winding end of the fourth small coil group W202, are connected using a crossover wire 713 such that the first small coil group W101 and the fourth small coil group W202 are connected in series. W1-6B, which is a radially inner winding end of the second small coil group W102, and W2-7B, which is a radially inner winding end of the third small coil group W201, are connected using a crossover wire 723 such that the second small coil group W102 and the third small coil group W201 are connected in series. The V-phase coil and the U-phase coil are also connected using crossover wires 711, 712, 721, and 722 in a similar manner to those of Embodiment 1 above. Connection of all of the winding ends of the radially inner winding end group 700 is thereby completed by connection between winding ends within the radially inner winding end group 700.

Next, W1-1A, which is a radially outer winding end of the first small coil group W101, and W1-8A, which is a radially outer winding end of the second small coil group W102, are connected using a crossover wire 813, and W2-1A, which is a radially outer winding end of the third small coil group W201, and W2-8A, which is a radially outer winding end of the fourth small coil group W202, are connected using a crossover wire 823. A W-phase coil is obtained thereby that is configured into a parallel circuit in which coils in each of which eight winding bodies 22 are connected in series are connect in parallel. Although not shown, the U-phase coil and the V-phase coil are also connected using crossover wires 811, 812, 821, and 822 in a similar manner to those of Embodiment 1 above such that connection of all of the winding ends of the radially outer winding end group 800 is thereby completed by connection between winding ends within the radially outer winding end group 800.

Figure 41:
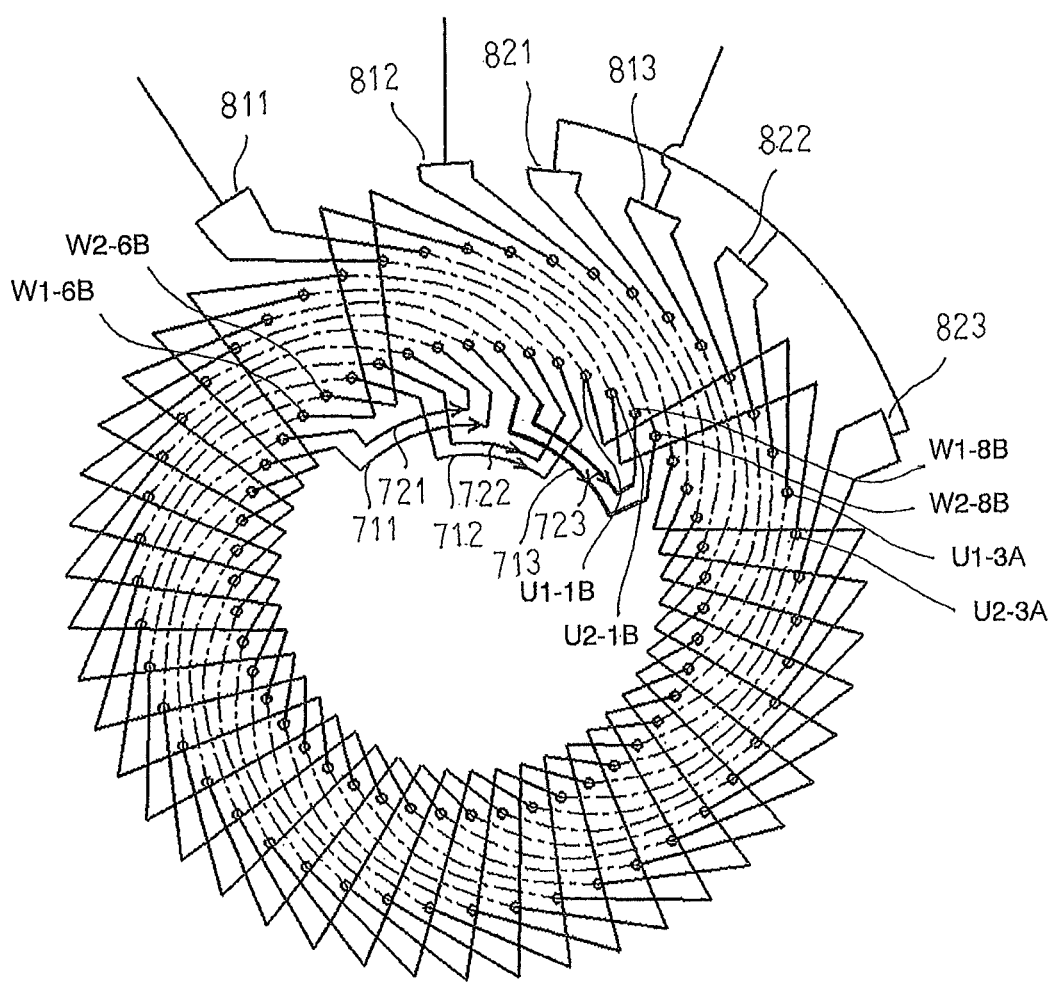
FIG. 41 is a schematic diagram that shows a method for connecting winding assemblies in the rotary electric machine according to Embodiment 1 of the present invention.

Next, effects of the connecting method according to Embodiment 2 will be explained using FIGS. 41 and 42. FIG. 41 is a schematic diagram that shows a method for connecting winding assemblies in the rotary electric machine according to Embodiment 1 of the present invention, and FIG. 42 is a schematic diagram that shows a method for connecting winding assemblies in the rotary electric machine according to Embodiment 2 of the present invention.

FIG. 41 is a schematic diagram of a winding assembly in which phase coils of a parallel circuit according to Embodiment 1 are wye-connected, and in the figure, arrows that are applied to the crossover wires 711, 712, 713, 721, 722, and 723 between the winding ends of the radially inner winding end group 700 indicate directions from electric power supplying portions toward the neutral point. In this connection method, the crossover wires 713 and 723 that connect radially inner winding ends of the W-phase coil together have constructions that span the crossover wire 711 that connects U1-7B and U2-8B, the crossover wire 721 that connects U1-8B and U2-7B, the crossover wire 712 that connects V1-7B and V2-8B, and the crossover wire 722 that connects V1-8B and V2-7B, and the radially inner winding end group 700 is spread out circumferentially.

Figure 42:
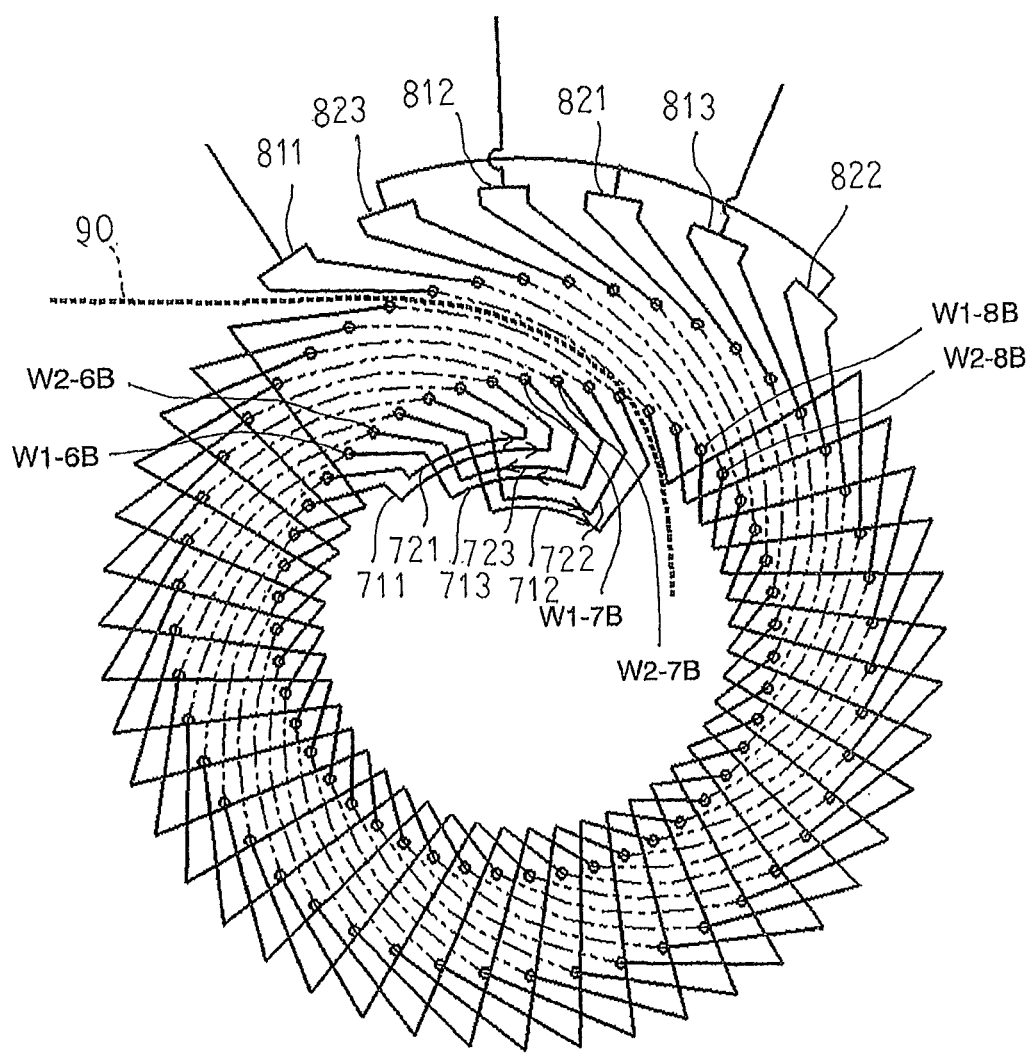
FIG. 42 is a schematic diagram that shows a method for connecting winding assemblies in the rotary electric machine according to Embodiment 2 of the present invention.

In the connection method according to Embodiment 2, as shown in FIG. 42, the directions from the electric power supplying portions toward the neutral point in the crossover wires 713 and 723 between the radially inner winding ends of the W-phase coil are reverse directions to the directions from the electric power supplying portions toward the neutral point in the crossover wires 711, 712, 721, and 722 between the radially inner winding ends of the U-phase coil and the V-phase coil relative to the circumferential direction of the winding assembly 21. Thus, a circumferential angular range occupied by the radially inner winding end group 700 is made narrower by arranging the winding ends that con-stitute the radially inner winding end group 700 consecutively in the circumferential direction, enabling the rotary electric machine to be reduced in size.

In the connection method according to Embodiment 2, as shown in FIG. 42, winding ends that constitute the radially outer winding end group 800 that form the electric power supplying portions are also arranged consecutively in the circumferential direction in a similar manner to the winding ends that constitute the radially inner winding end group 700, making the winding assembly 21 separable at a position that is indicated by a broken line 90 in FIG. 42. Thus, it is possible to open the connected winding assembly 21 into a C shape. In other words, joining between the winding ends of the winding bodies 22 becomes possible partway through assembly of the winding assembly 21 such as that shown in FIGS. 10 through 18. Thus, handling of the winding bodies 22 is facilitated by joining winding bodies 22 that were loose. In addition, by joining and integrating a plurality of the winding bodies 22, the winding bodies 22 are stabilized, improving assembly of the winding assembly 21.

Now, in Embodiment 2 above, the three-phase alternating-current winding is configured by wye-connecting the U-phase coil, the V-phase coil, and the W-phase coil, but a three-phase alternating-current winding may be configured by delta-connecting a U-phase coil, a V-phase coil, and a W-phase coil. Specifically, a three-phase alternating-current winding may be configured by delta-connecting a U-phase coil, a V-phase coil, and a W-phase coil by linking the crossover wires 823 and 811, linking the crossover wires 821 and 812, and linking the crossover wires 822 and 813 in FIG. 42. In that case also, the directions in the crossover wires 713 and 723 from linking portions between the crossover wires 822 and 813 (a first electric power supplying portion) toward linking portions between the crossover wires 823 and 811 (a second electric power supplying portion) at two ends of the W-phase coil are reverse directions to the directions in the crossover wires 711 and 721 from the linking portions between the crossover wires 823 and 811 (the second electric power supplying portion) toward linking portions between the crossover wires 821 and 812 (a third electric power supplying portion) at two ends of the U-phase coil and the directions in the crossover wires 712 and 722 from the linking portions between the crossover wires 821 and 812 (the third electric power supplying portion) toward the linking portions between the crossover wires 822 and 813 (the first electric power supplying portion) at two ends of the V-phase coil relative to the circumferential direction of the winding assembly 21. The winding ends that constitute the radially inner winding end group 700 and the radially outer winding end group 800 are each arranged consecutively in the circumferential direction, making the winding assembly separable in the circumferential direction. Consequently, similar or identical effects can be achieved in Embodiment 2 even if the three-phase alternating-current winding is configured by delta-connecting the U-phase coil, the V-phase coil, and the W-phase coil.

Embodiment 3

Figure 43:
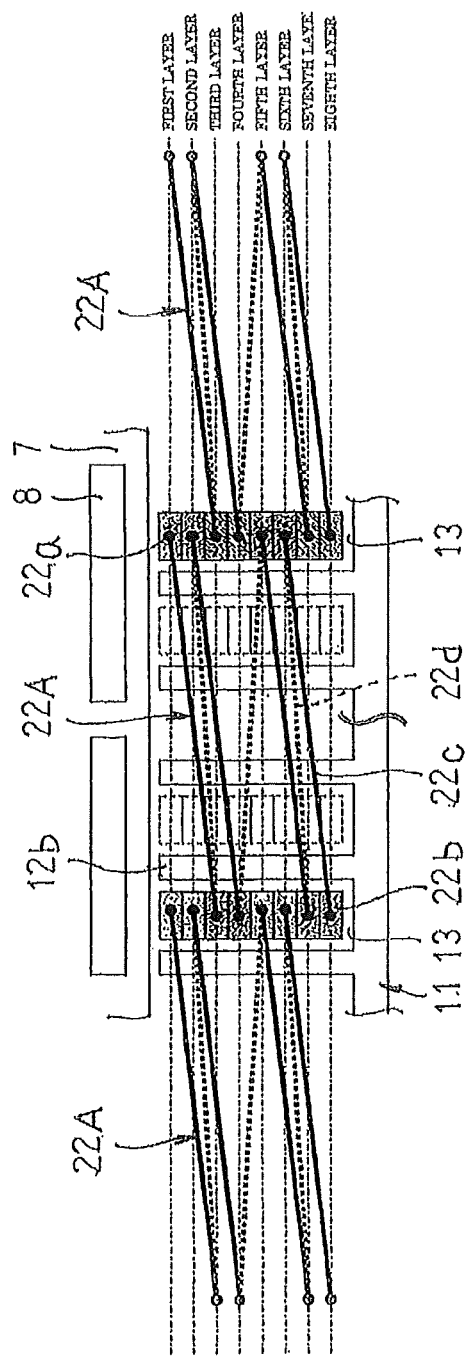
FIG. 43 is a developed projection of a state in which three winding bodies in a rotary electric machine according to Embodiment 3 of the present invention are mounted into identical slot groups of an armature core consecutively in a circumferential direction when viewed from a side near a first axial end.

FIG. 43 is a developed projection of a state in which three winding bodies in a rotary electric machine according to Embodiment 3 of the present invention are mounted into identical slot groups of an armature core consecutively in a circumferential direction when viewed from a side near a first axial end. Moreover, in FIG. 43, coil ends are represented as straight lines for simplicity.

In FIG. 43, winding bodies 22A include: four first rectilinear portions 22a that are housed in a first layer, a second layer, a fifth layer, and a sixth layer of a slot 13 on a first side of six consecutive teeth 12b; four second rectilinear portions 22b that are housed in a third layer, a fourth layer, a seventh layer, and an eighth layer of a slot 13 on a second side of the six consecutive teeth 12b; and first and second coil ends 22c and 22d that alternately link first longitudinal ends to each other and second longitudinal ends to each other between columns of the first and second rectilinear portions 22a and 22b.

Four first coil ends 22c extend outward at a set angle of inclination longitudinally outward relative to the first and second rectilinear portions 22a and 22b from first ends of the first rectilinear portions 22a in the first layer, the second layer, the fifth layer, and the sixth layer in the first slot 13 toward the second rectilinear portions 22b in a second column, are respectively bent approximately at right angles at first top portions 22e (not shown) and displaced by a distance 2d radially outward (toward bottom portions in a slot depth direction), and are subsequently bent approximately at right angles and extend longitudinally inward relative to the first and second rectilinear portions 22a and 22b toward the second rectilinear portions 22b in the second slot 13 at the set angle of inclination, and are connected to first ends of the second rectilinear portion 22b in the third layer, the fourth layer, the seventh layer, and the eighth layer in the second slot 13.

Two second coil ends 22d extend outward at the set angle of inclination longitudinally outward relative to the first and second rectilinear portions 22a and 22b from second ends of the second rectilinear portions 22b in the third layer and the seventh layer in the second slot 13 toward the first rectilinear portions 22a in the first slot 13, are bent approximately at right angles at second top portions 22f (not shown) and displaced radially inward (toward openings in a slot depth direction) so as to leave a gap d, and are subsequently bent approximately at right angles and extend longitudinally inward relative to the first and second rectilinear portions 22a and 22b toward the first rectilinear portions 22a in the first slot 13 at the set angle of inclination, and are connected to second ends of the first rectilinear portions 22a in the second layer and the sixth layer in the first slot 13.

One second coil end 22d extends outward at the set angle of inclination longitudinally outward relative to the first and second rectilinear portions 22a and 22b from a second end of the second rectilinear portion 22b in the fourth layer in the second slot 13 toward the first rectilinear portions 22a in the first slot 13, is bent approximately at right angles at a second top portion 22f (not shown) and displaced radially outward so as to leave a gap d, and is subsequently bent approximately at right angles and extends longitudinally inward relative to the first and second rectilinear portions 22a and 22b toward the first rectilinear portions 22a in the first slot 13 at the set angle of inclination, and is connected to second end of the first rectilinear portion 22a in the fifth layer in the first slot 13.

In the winding bodies 22A that are configured in this manner, the first and second rectilinear portions 22a and 22b, and the first and second coil ends 22c and 22d, are arranged respectively in a direction of short sides of rectangular cross sections of the conductor wire in a single column such that flat surfaces that are constituted by long sides of the rectangular cross sections of the conductor wire face each other. The first and second rectilinear portions 22a and 22b are displaced radially by an amount of radial displacement at the first and second top portions 22e and 22f of the linking first and second coil ends 22c and 22d. Specifically, the first rectilinear portions 22a are housed in the first layer, the second layer, the fifth layer, and the sixth layer inside the first slot 13, and the second rectilinear portions 22b are housed in the third layer, the fourth layer, the seventh layer, and the eighth layer inside the second slot 13.

The first rectilinear portions 22a of a first winding body 22A and the second rectilinear portions 22b of a second winding body 22A are housed in respective slots 13 so as to line up in a single column in a radial direction (in a slot depth direction). The first rectilinear portions 22a of the first winding body 22A are housed in the first layer, the second layer, the fifth layer, and the sixth layer, and the second rectilinear portions 22b of the second winding body 22A are housed in the third layer, the fourth layer, the seventh layer, and the eighth layer.

Thus, the winding bodies 22A are arranged at a pitch of one slot in a circumferential direction without interfering with each other. The winding ends 22g and 22h of the winding bodies 22A also project in identical directions in a longitudinal direction of the first and second rectilinear portions 22a and 22b from diagonally opposite positions at a second end of the winding bodies 22A. Consequently, similar or identical effects to those in Embodiment 1 above are also exhibited if a winding assembly is produced using the winding bodies 22A instead of the winding bodies 22, and the winding ends within the radially inner winding end group are linked to each other and the winding ends within the radially outer winding end group are linked to each other in a similar or identical manner to Embodiment 1 above.

Embodiment 4

Figure 44:
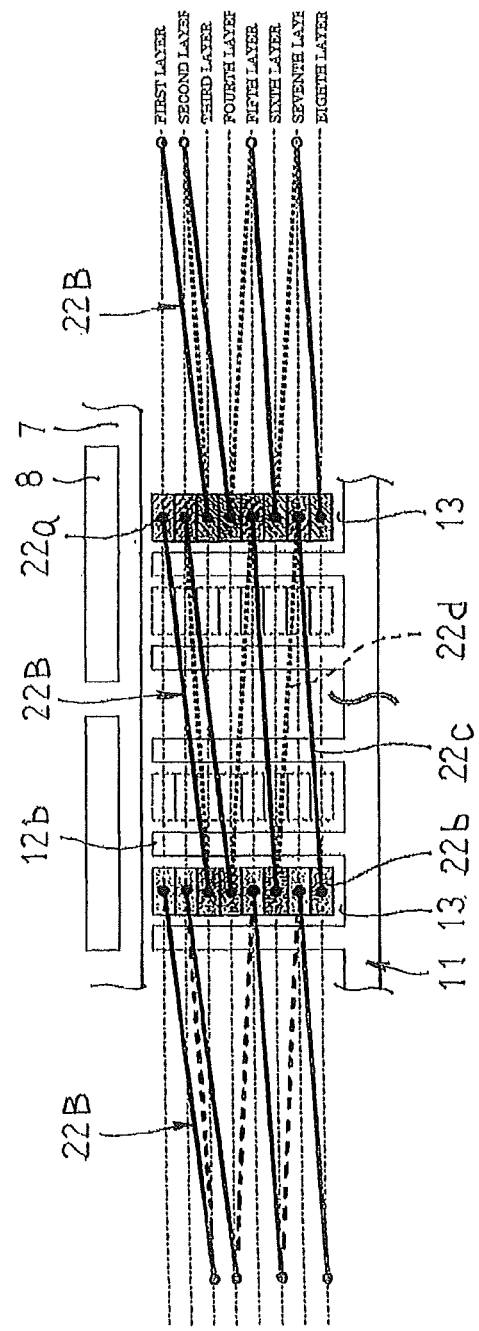
FIG. 44 is a developed projection of a state in which three winding bodies in a rotary electric machine according to Embodiment 4 of the present invention are mounted into identical slot groups of an armature core consecutively in a circumferential direction when viewed from a side near a first axial end.

FIG. 44 is a developed projection of a state in which three winding bodies in a rotary electric machine according to Embodiment 4 of the present invention are mounted into identical slot groups of an armature core consecutively in a circumferential direction when viewed from a side near a first axial end. Moreover, in FIG. 44, coil ends are represented as straight lines for simplicity.

In FIG. 44, winding bodies 22B include: four first rectilinear portions 22a that are housed in a first layer, a second layer, a fifth layer, and a seventh layer of a slot 13 on a first side of six consecutive teeth 12b; four second rectilinear portions 22b that are housed in a third layer, a fourth layer, a sixth layer, and an eighth layer of a slot 13 on a second side of the six consecutive teeth 12b; and first and second coil ends 22c and 22d that alternately link first longitudinal ends to each other and second longitudinal ends to each other between columns of the first and second rectilinear portions 22a and 22b.

Two first coil ends 22c extend outward at a set inclination longitudinally outward relative to the first and second rectilinear portions 22a and 22b from first ends of the first rectilinear portions 22a in the first layer and the second layer in the first slot 13 toward the second rectilinear portions 22b in a second column, are respectively bent approximately at right angles at first top portions 22e (not shown) and displaced by a distance 2d radially outward (toward bottom portions in a slot depth direction), and are subsequently bent approximately at right angles and extend longitudinally inward relative to the first and second rectilinear portions 22a and 22b toward the second rectilinear portions 22b in the second slot 13 at the set inclination, and are connected to first ends of the second rectilinear portion 22b in the third layer and the fourth layer in the second slot 13.

Another two first coil ends 22c extend outward at the set inclination longitudinally outward relative to the first and second rectilinear portions 22a and 22b from first ends of the first rectilinear portions 22a in the fifth layer and the seventh layer in the first slot 13 toward the second rectilinear portions 22b in a second column, are respectively bent approximately at right angles at first top portions 22e (not shown) and displaced radially outward (toward bottom portions in a slot depth direction) so as to leave a gap d, and are subsequently bent approximately at right angles and extend longitudinally inward relative to the first and second rectilinear portions 22a and 22b toward the second rectilinear portions 22b in the second slot 13 at the set inclination, and are connected to first ends of the second rectilinear portion 22b in the sixth layer and the eighth layer in the second slot 13.

One second coil end 22d extends outward at the set inclination longitudinally outward relative to the first and second rectilinear portions 22a and 22b from a second end of the second rectilinear portion 22b in the third layer in the second slot 13 toward the first rectilinear portions 22a in the first slot 13, is bent approximately at right angles at a second top portion 22f (not shown) and displaced radially inward (toward openings in a slot depth direction) so as to leave a gap d, and is subsequently bent approximately at right angles and extends longitudinally inward relative to the first and second rectilinear portions 22a and 22b toward the first rectilinear portions 22a in the first slot 13 at the set inclination, and is connected to second end of the first rectilinear portion 22a in the second layer in the first slot 13.

Another two second coil ends 22d extend outward at the set inclination longitudinally outward relative to the first and second rectilinear portions 22a and 22b from second ends of the second rectilinear portions 22b in the fourth layer and the sixth layer in the second slot 13 toward the first rectilinear portions 22a in the first slot 13, are bent approximately at right angles at second top portions 22f (not shown) and displaced radially outward so as to leave a gap d, and are subsequently bent approximately at right angles and extend longitudinally inward relative to the first and second rectilinear portions 22a and 22b toward the first rectilinear portions 22a in the first slot 13 at the set inclination, and are connected to second ends of the first rectilinear portions 22a in the fifth layer and the seventh layer in the first slot 13.

In the winding bodies 22B that are configured in this manner, the first and second rectilinear portions 22a and 22b, and the first and second coil ends 22c and 22d, are arranged respectively in a direction of short sides of rectangular cross sections of the conductor wire in a single column such that flat surfaces that are constituted by long sides of the rectangular cross sections of the conductor wire face each other. The first and second rectilinear portions 22a and 22b are displaced radially by an amount of radial displacement at the first and second top portions 22e and 22f of the linking first and second coil ends 22c and 22d. Specifically, the first rectilinear portions 22a are housed in the first layer, the second layer, the fifth layer, and the seventh layer inside the first slot 13, and the second rectilinear portions 22b are housed in the third layer, the fourth layer, the sixth layer, and the eighth layer inside the second slot 13.

The first rectilinear portions 22a of a first winding body 22B and the second rectilinear portions 22b of a second winding body 22B are housed in respective slots 13 so as to line up in a single column in a radial direction (in a slot depth direction). The first rectilinear portions 22a of the first winding body 22B are housed in the first layer, the second layer, the fifth layer, and the seventh layer, and the second rectilinear portions 22b of the second winding body 22B are housed in the third layer, the fourth layer, the sixth layer, and the eighth layer.

Thus, the winding bodies 22B are arranged at a pitch of one slot in a circumferential direction without interfering with each other. The winding ends 22g and 22h of the winding bodies 22B also project in identical directions in a longitudinal direction of the first and second rectilinear portions 22a and 22b from diagonally opposite positions at a second end of the winding bodies 22B. Consequently, similar or identical effects to those in Embodiment 1 above are exhibited a winding assembly is produced using the winding bodies 22B instead of the winding bodies 22, and the winding ends within the radially inner winding end group are linked to each other and the winding ends within the radially outer winding end group are linked to each other in a similar or identical manner to Embodiment 1 above.

Moreover, in each of the above embodiments, the winding bodies 22 are configured by winding jointless continuous conductor wires helically, but winding bodies may be configured by winding conductor wires helically that are produced by linking short conductors, for example.

In each of the above embodiments, an inner-rotor electric motor has been explained, but similar or identical effects are also exhibited if the present invention is applied to an outer-rotor electric motor.

In each of the above embodiments, cases in which the present application has been applied to an electric motor have been explained, but similar or identical effects are also exhibited if the present application is applied to a generator.

In each of the above embodiments, winding bodies are produced using conductor wires that are coated with insulation, but an insulation coating treatment may be applied to winding bodies that are produced using conductor wires that are not coated with insulation.

In each of the above embodiments, an eight-pole forty-eight-slot rotary electric machine has been explained, but it goes without saying that the number of poles and the number of slots are not limited to eight poles and forty-eight slots.

In each of the above embodiments, winding bodies are configured by winding conductor wires for four turns into a helical shape, but the number of turns of the conductor wire is not limited to four turns provided that it is greater than or equal to two turns.

The invention claimed is:

1. A rotary electric machine comprising an armature that is configured by mounting an armature winding into an annular armature core, slots being formed on said armature core at a ratio of q slots per phase per pole, where q is a natural number that is greater than or equal to two,
wherein:
said armature winding comprises a plurality of winding bodies that are each configured by winding a conductor wire into a helical shape for m turns, where m is a natural number that is greater than or equal to two, so as to have:
rectilinear portions that are arranged into first and second columns such that m of said rectilinear portions line up in each of said columns; and
coil ends that link together end portions of said rectilinear portions between said columns,
a first winding end of said conductor wire extending outward at a first longitudinal end of a rectilinear portion that is positioned at a first end in a direction of arrangement of said rectilinear portions in said first column, and a second winding end of said conductor wire extending outward at said first longitudinal end of a rectilinear portion that is positioned at a second end in said direction of arrangement of said rectilinear portions in said second column;

said plurality of winding bodies are respectively arranged at a pitch of one slot in a circumferential direction of said armature core such that each of said columns of said rectilinear portions that are arranged in said two columns is housed in each of a pair of slots that are positioned on two sides of a plurality of teeth that are consecutive in said circumferential direction, said first winding ends being arranged circumferentially so as to extend outward from a shallowest portion in a slot depth direction of said slots to form a radially inner winding end group, and said second winding ends being arranged circumferentially so as to extend outward from a deepest portion in said slot depth direction of said slots to form a radially outer winding end group;

phase coils that constitute said armature winding each comprise 2q small coil groups that make one round circumferentially, said small coil groups being formed by connecting in series winding bodies that are housed in a pair of slots that are separated by 360 electrical degrees by linking winding ends of said radially inner winding end group and winding ends of said radially outer winding end group in order of circumferential arrangement; and connection between said small coil groups that form said phase coils and connection between said phase coils are made by connecting together winding ends within said radially inner winding end group and connecting together winding ends within said radially outer winding end group.

2. The rotary electric machine according to claim 1, wherein:
said armature winding is a three-phase alternating-current winding that is configured by wye-connecting three phase coils, and a direction from an electric power supplying portion toward a neutral point in a linking portion between said winding ends within said radially inner winding end group or a linking portion between said winding ends within said radially outer winding end group that connects said two small coil groups in one of said phase coils is opposite to a direction from an electric power supplying portion toward said neutral point in a linking portion between said winding ends within said radially inner winding end group or a linking portion between said winding ends within said radially outer winding end group that connects said two small coil groups in other phase coils relative to said circumferential direction of said armature winding; and
said winding ends within said radially inner winding end group or said winding ends within said radially outer winding end group are arranged consecutively in said circumferential direction.

3. The rotary electric machine according to claim 1, wherein:
said armature winding is a three-phase alternating-current winding that is configured by delta-connecting three phase coils, and a direction of arrangement of an electric power supplying portion that is arranged in a circuit of said delta connection in a linking portion between said winding ends within said radially inner winding end group or a linking portion between said winding ends within said radially outer winding end group that connects said two small coil groups in one of said phase coils is opposite to a direction of arrangement of an electric power supplying portion that is arranged in said circuit of said delta connection in a linking portion between said winding ends within said radially inner winding end group or a linking portion between said winding ends within said radially outer winding end group that connects said two small coil groups in other phase coils relative to said circumferential direction of said armature winding; and
said winding ends within said radially inner winding end group or said winding ends within said radially outer winding end group are arranged consecutively in said circumferential direction.

4. The rotary electric machine according to claim 1, wherein two of said small coil groups that are connected by linking together winding ends within said radially inner winding end group or by linking together winding ends within said radially outer winding end group are separated by an electrical angle of $\pi \pm (\pi \times p/S) \times l$, where S is a number of slots, p is a number of poles, and l is a natural number that satisfies $0 < l \leq q-1$.

5. The rotary electric machine according to claim 4, wherein:
said armature winding is a three-phase alternating-current winding that is configured by wye-connecting three phase coils, and a direction from an electric power supplying portion toward a neutral point in a linking portion between said winding ends within said radially inner winding end group or a linking portion between said winding ends within said radially outer winding end group that connects said two small coil groups in one of said phase coils is opposite to a direction from an electric power supplying portion toward said neutral point in a linking portion between said winding ends within said radially inner winding end group or a linking portion between said winding ends within said radially outer winding end group that connects said two small coil groups in other phase coils relative to said circumferential direction of said armature winding; and
said winding ends within said radially inner winding end group or said winding ends within said radially outer winding end group are arranged consecutively in said circumferential direction.

6. The rotary electric machine according to claim 4, wherein:
said armature winding is a three-phase alternating-current winding that is configured by delta-connecting three phase coils, and a direction of arrangement of an electric power supplying portion that is arranged in a circuit of said delta connection in a linking portion between said winding ends within said radially inner winding end group or a linking portion between said winding ends within said radially outer winding end group that connects said two small coil groups in one of said phase coils is opposite to a direction of arrangement of an electric power supplying portion that is arranged in said circuit of said delta connection in a linking portion between said winding ends within said radially inner winding end group or a linking portion between said winding ends within said radially outer winding end group that connects said two small coil groups in other phase coils relative to said circumferential direction of said armature winding; and
said winding ends within said radially inner winding end group or said winding ends within said radially outer winding end group are arranged consecutively in said circumferential direction.

7. The rotary electric machine according to claim 1, wherein said winding ends within said radially inner winding end group are linked to each other and said winding ends within said radially outer winding end group are linked to each other by connecting members that are separate members from said winding bodies.

8. The rotary electric machine according to claim 1, wherein said armature core is configured by arranging core blocks that comprise a circular arc-shaped core back portion and a tooth into an annular shape by abutting together circumferential side surfaces of said core back portions.

* * * * *